(12) United States Patent
Yamaoka et al.

(10) Patent No.: US 7,357,718 B2
(45) Date of Patent: *Apr. 15, 2008

(54) SERVER FOR NETWORK GAME, NETWORK GAME PROCESS CONTROL METHOD, NETWORK GAME PROGRESS CONTROL PROGRAM AND RECORDING MEDIUM STORING NETWORK GAME PROGRESS CONTROL PROGRAM

(75) Inventors: Masatoshi Yamaoka, Sakai (JP); Kazuhiro Namba, Amagasaki (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 604 days.

This patent is subject to a terminal disclaimer.

(21) Appl. No.: 10/188,400

(22) Filed: Jul. 2, 2002

(65) Prior Publication Data
US 2003/0008710 A1    Jan. 9, 2003

(30) Foreign Application Priority Data
Jul. 5, 2001    (JP)    ............................. 2001-205226

(51) Int. Cl.
G09G 5/00    (2006.01)
(52) U.S. Cl. ....................................... 463/41
(58) Field of Classification Search .................. 463/43, 463/16, 25, 40–42; 700/91–92
See application file for complete search history.

(56) References Cited

U.S. PATENT DOCUMENTS 4,592,546 A * 6/1986 Fascenda et al. ............. 463/29
5,588,649 A   12/1996 Blumberg et al.
5,749,785 A    5/1998 Rossides
5,782,470 A *  7/1998 Langan ....................... 273/139
5,810,359 A *  9/1998 Wilkins et al. ............. 273/256
5,816,918 A * 10/1998 Kelly et al. .................... 463/16
5,984,780 A * 11/1999 Takemoto et al. ............ 463/20
6,015,345 A    1/2000 Kail (Continued)

FOREIGN PATENT DOCUMENTS

EP    0 873 772    10/1998

(Continued)

OTHER PUBLICATIONS

Diablo II Handbook, Blizzarrd Entertainment, RAD Inc, 2000. pp. 10-15, 26-28, 30-37, & 72.*

(Continued)

*Primary Examiner*—Ronald Laneau
*Assistant Examiner*—Tramar Harper
(74) *Attorney, Agent, or Firm*—Jordan and Hamburg LLP

(57) ABSTRACT

In order to enable a user to play a game continuously and to facilitate acquisition of valuable data by the user, the present invention provides a network game server device 1 that conducts a game in which a user is enabled to acquire valuable data having a prescribed value while performing transmission/reception of data with a terminal device employed by the user through a network 2 enables the user to play a single game of a plurality of games; awards prescribed points to this user in accordance with the results of the game played by the user; and provides to this user valuable data having a prescribed value in accordance with the points awarded to the user.

19 Claims, 16 Drawing Sheets

U.S. PATENT DOCUMENTS

| | | | |
|---|---|---|---|
| 6,113,495 A * | 9/2000 | Walker et al. | 463/42 |
| 6,126,542 A * | 10/2000 | Fier | 463/16 |
| 6,135,881 A | 10/2000 | Abbott et al. | |
| 6,200,216 B1 | 3/2001 | Peppel | |
| 6,236,900 B1 | 5/2001 | Geiger | |
| 6,298,442 B1 * | 10/2001 | Kocher et al. | 713/194 |
| 6,385,596 B1 | 5/2002 | Wiser et al. | |
| 6,582,310 B1 * | 6/2003 | Walker et al. | 463/42 |
| 7,144,323 B2 * | 12/2006 | Yamaoka et al. | 463/42 |
| 2001/0000044 A1 * | 3/2001 | Lin | 705/26 |
| 2002/0115489 A1 * | 8/2002 | Jordan et al. | 463/42 |
| 2002/0142839 A1 * | 10/2002 | Wolinsky | 463/41 |
| 2002/0142846 A1 * | 10/2002 | Paulsen | 463/43 |
| 2002/0151364 A1 * | 10/2002 | Suchocki | 463/42 |
| 2002/0198053 A1 | 12/2002 | Yamaoka et al. | |

FOREIGN PATENT DOCUMENTS

| | | |
|---|---|---|
| EP | 0 934 765 | 8/1999 |
| JP | 6-295390 | 10/1994 |
| JP | 10-145423 | 5/1998 |
| JP | 2001-157721 | 6/2000 |
| JP | 2000-268107 | 9/2000 |
| JP | 2000-296271 | 10/2000 |
| JP | 2000-298631 | 10/2000 |
| JP | 2000-325656 | 11/2000 |
| JP | 2001-43278 | 2/2001 |
| JP | 2001-56834 | 2/2001 |
| JP | 2001-155061 | 6/2001 |
| JP | 2001-297169 | 10/2001 |
| JP | 2001-353371 | 12/2001 |
| JP | 2000-24688 | 1/2002 |
| KR | 2000-0054116 | 9/2000 |

OTHER PUBLICATIONS

"I-mode official game navigation", the first edition, Kabushiki Kaisha Enix, published on Oct. 13, 2000, pp. 8-11.

"Perfect capturing guidance for i-mode game", published by T2 publishing Co., Ltd., on Aug. 15, 2000, pp. 64 to 65.

* cited by examiner

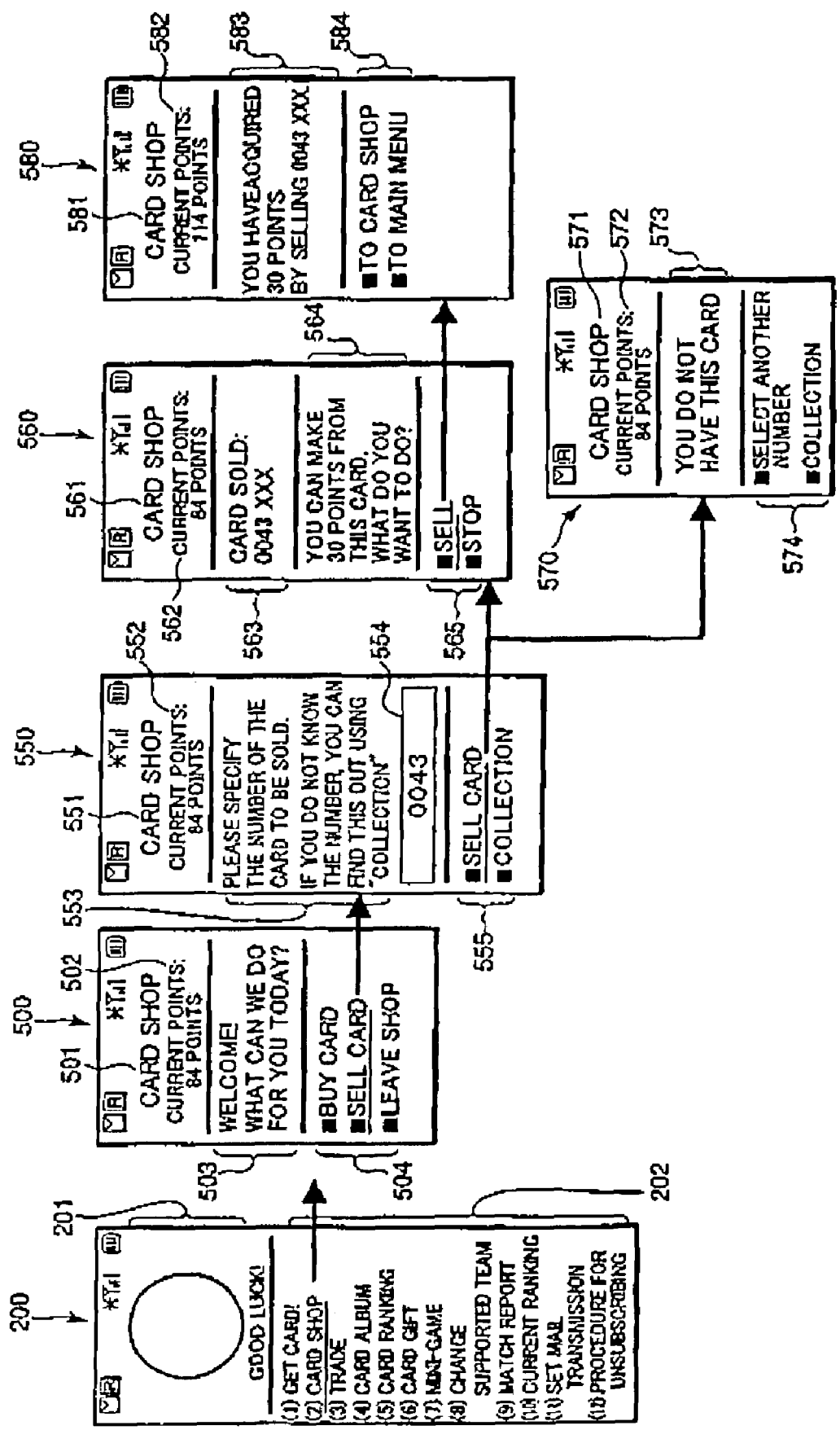

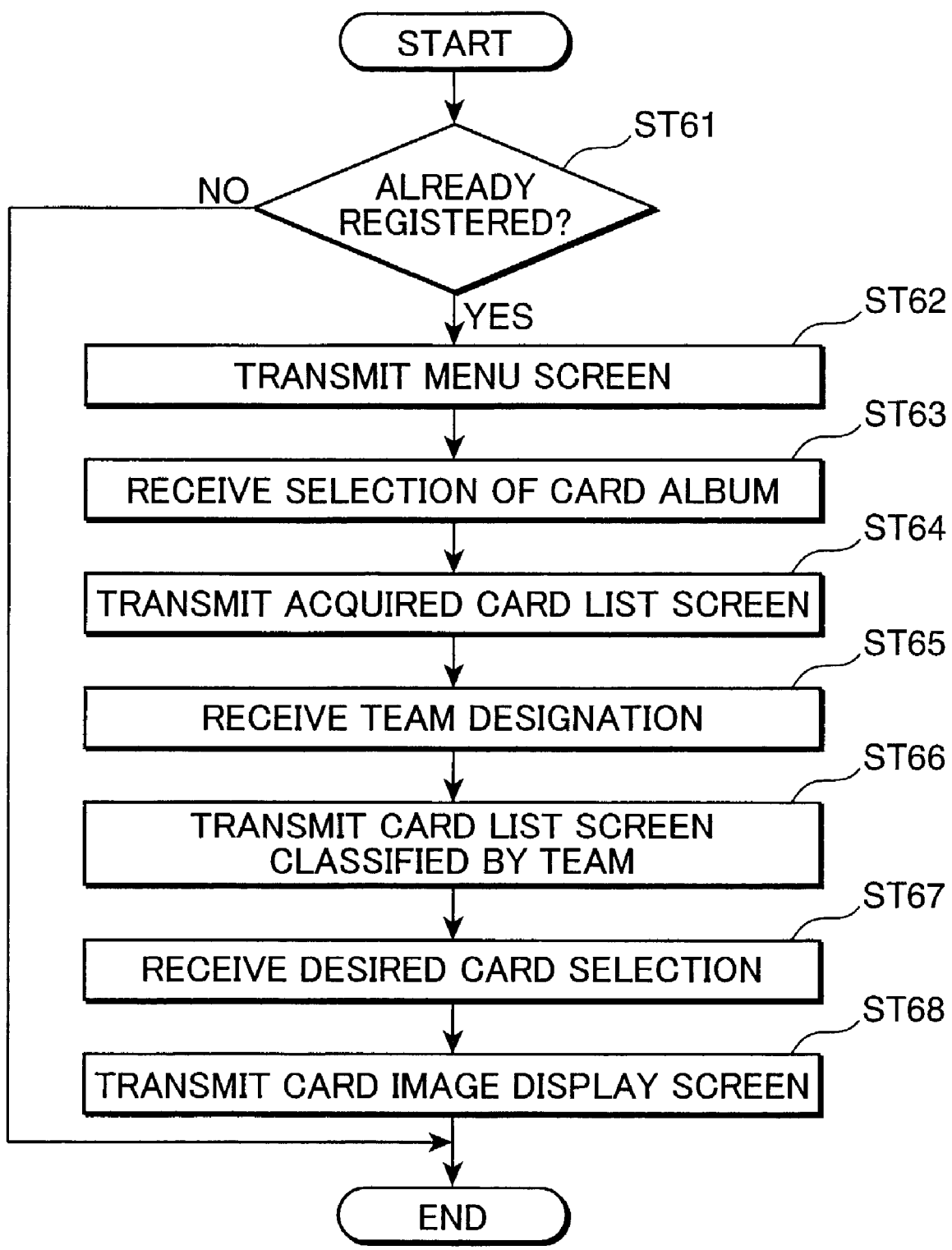

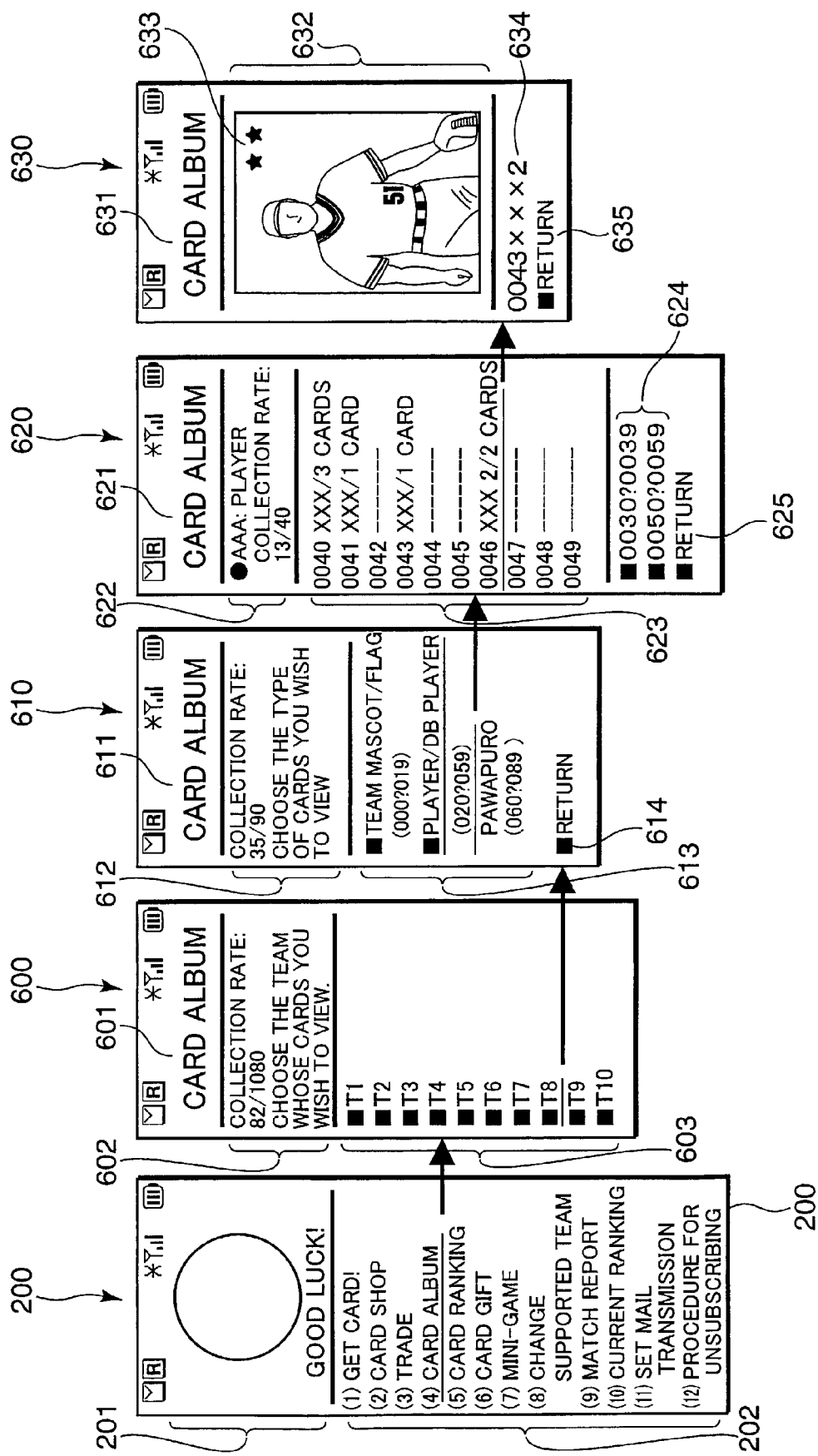

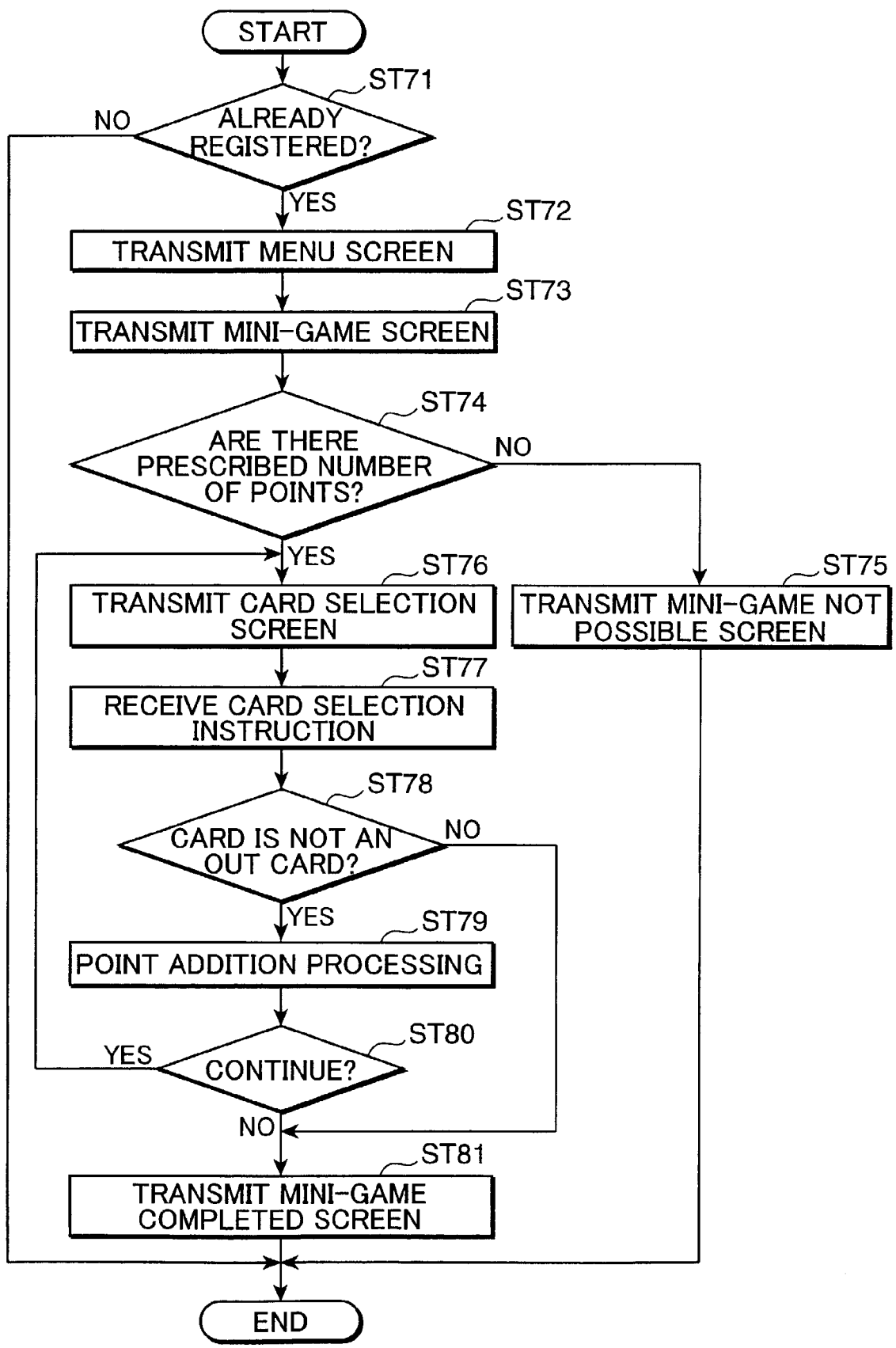

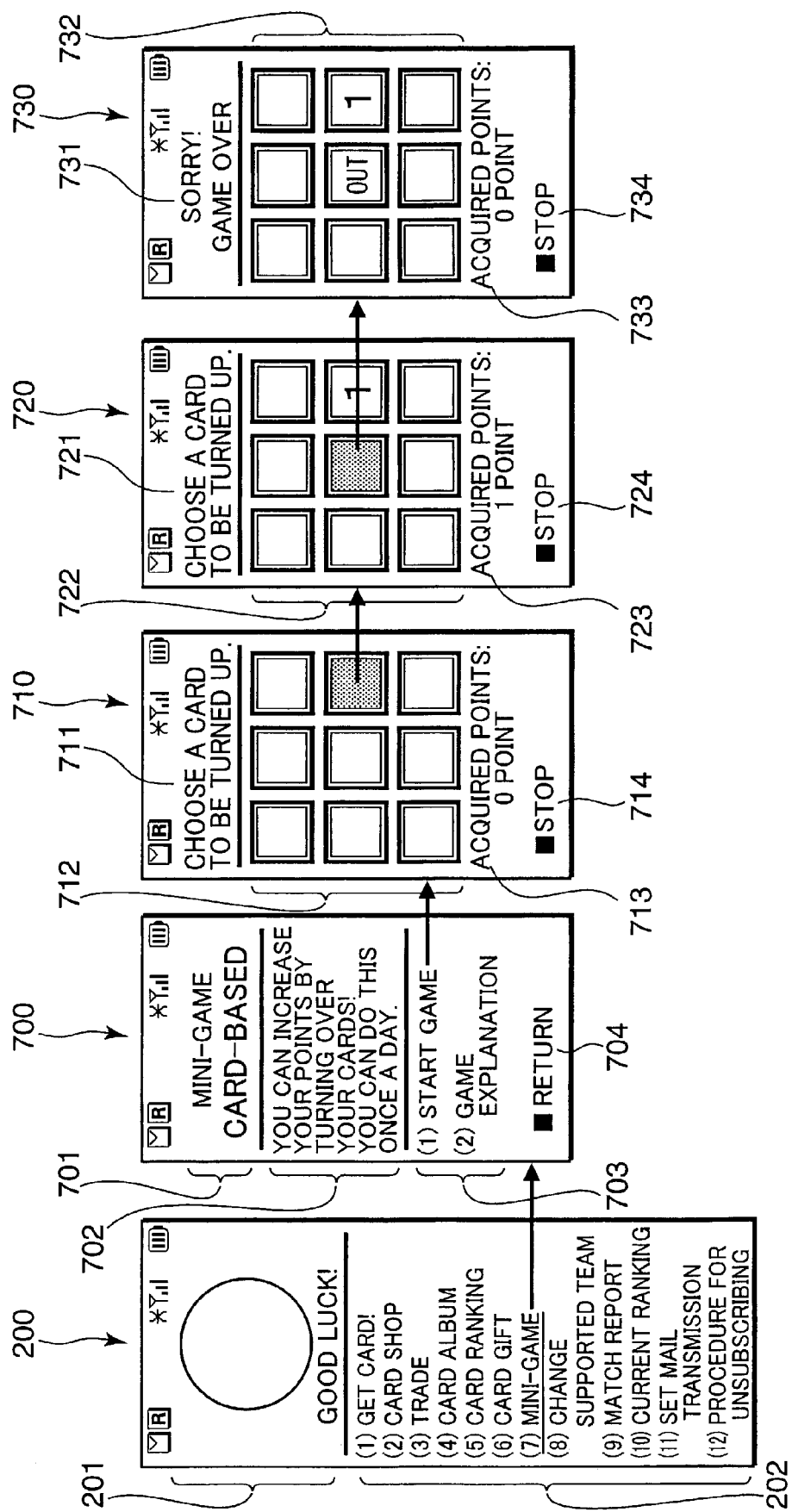

SERVER FOR NETWORK GAME, NETWORK GAME PROCESS CONTROL METHOD, NETWORK GAME PROGRESS CONTROL PROGRAM AND RECORDING MEDIUM STORING NETWORK GAME PROGRESS CONTROL PROGRAM

BACKGROUND OF THE INVENTION

1. Field of the Invention

The present invention relates to a network game that is executed by performing transmission and reception of data between a terminal device and a network game server through a network.

2. Description of the Related Art

In a known network game using a network such as the Internet, for example the user performs a lottery game using a terminal device such as a mobile telephone and in the event of a correct guess a service is provided such as providing image data (valuable data) of for example a pop star to the user.

However, in the above lottery game, image data are provided to the user in accordance with the results of single game based on the chance of a correct guess or a wrong guess. Consequently, the user can only acquire the image data, which is the objective, by playing the game, so the method of acquiring the image data is restricted. Also, the above lottery game did not increase the user's feeling of anticipation by increasing the rate of acquisition of image data in accordance with the extent of progress with the game so it was difficult to induce the user to play the game continuously.

SUMMARY OF THE INVENTION

An object of the present invention is to provide a network game server, network game progress control method and network game progress control program wherein the user can easily be induced to acquire valuable data and the user can be induced to play the game continuously.

In order to achieve the above objects, according to the present invention, a network game server device that conducts a game in which a user is enabled to acquire valuable data having a prescribed value by performing transmission/reception of data with a terminal device employed by the user through a network, comprising: game execution means for enabling the user to play a single game of a plurality of games; point awarding means that awards prescribed points to this user in accordance with the results of a game played by the user using said game execution means; and valuable data provision means that provides to this user valuable data having a prescribed value in accordance with the points awarded to the user by said point awarding means.

With the present invention described in the above, the user is enabled to play a single game of a plurality of games, this user is awarded prescribed points in accordance with the results of the game played by the user and valuable data having a prescribed value in accordance with the awarded points is provided to this user. In this way, since a plurality of games are provided whereby the points needed for acquiring valuable data having a prescribed value can be acquired, a plurality of methods of acquisition of the valuable data by the user can be provided. Also, since, rather than providing the valuable data directly to the user by playing the game, points needed for acquiring the valuable data are awarded, the feeling of anticipation of the user of for example increasing the rate of acquisition of valuable data in accordance with the degree of progress of the game can be increased.

These and other objects, features and advantageous of the present invention will become more apparent upon reading the following detailed description along with the accompanied drawings.

BRIEF DESCRIPTION OF THE DRAWINGS

FIG. 12 is an example of the changes of the screen displayed on mobile telephone 3 during exchange of valuable data and points;

FIG. 13 is a flow chart illustrating an example of the processing procedure performed by network game server 1 in accordance with a request from a user to peruse valuable data;

FIG. 14 is an example of a view of the changes of the screen displayed on mobile telephone 3 during perusal of valuable data;

FIG. 15 is a flow chart illustrating an example of the processing procedure performed by network game server 1 in awarding points when the user is enabled to play a mini-game; and FIG. 16 is an example of a view of the changes of the screen displayed on mobile telephone 3 during playing of the mini-game.

DESCRIPTION OF THE PREFERRED EMBODIMENTS

Hereinbelow, a network game system using a network game server 1 constituting an example of a network game server according to the present invention is described with reference to appropriate drawings.

It should be noted that, in the description below, various types of processing and the like performed by network game server 1 to enable a user to conduct these games are described whilst referring to appropriate drawings taking a professional baseball match results prediction game (first game) and card-based game (second game) as examples of a plurality of games for enabling a user to acquire points. The games for acquiring points could be of three or more types.

In particular, although, as a professional baseball match result prediction game, the description assumes that the user employing a mobile telephone constituting a terminal device is made to predict the results of professional baseball matches, the present invention is not particularly restricted to this example and may be applied to the prediction of other phenomena so long as the results as a prediction in regard to an actual phenomenon that occurs in the future can be acquired by network game server 1 (server for network game). For example, it could be applied to prediction in respect of sports, fights, races, or pop charts; results or rankings are particularly suitable for prediction, but it would also be possible to apply this to prediction or the like of weather data, marine data, political data, economic data, and the like.

Figure 1:
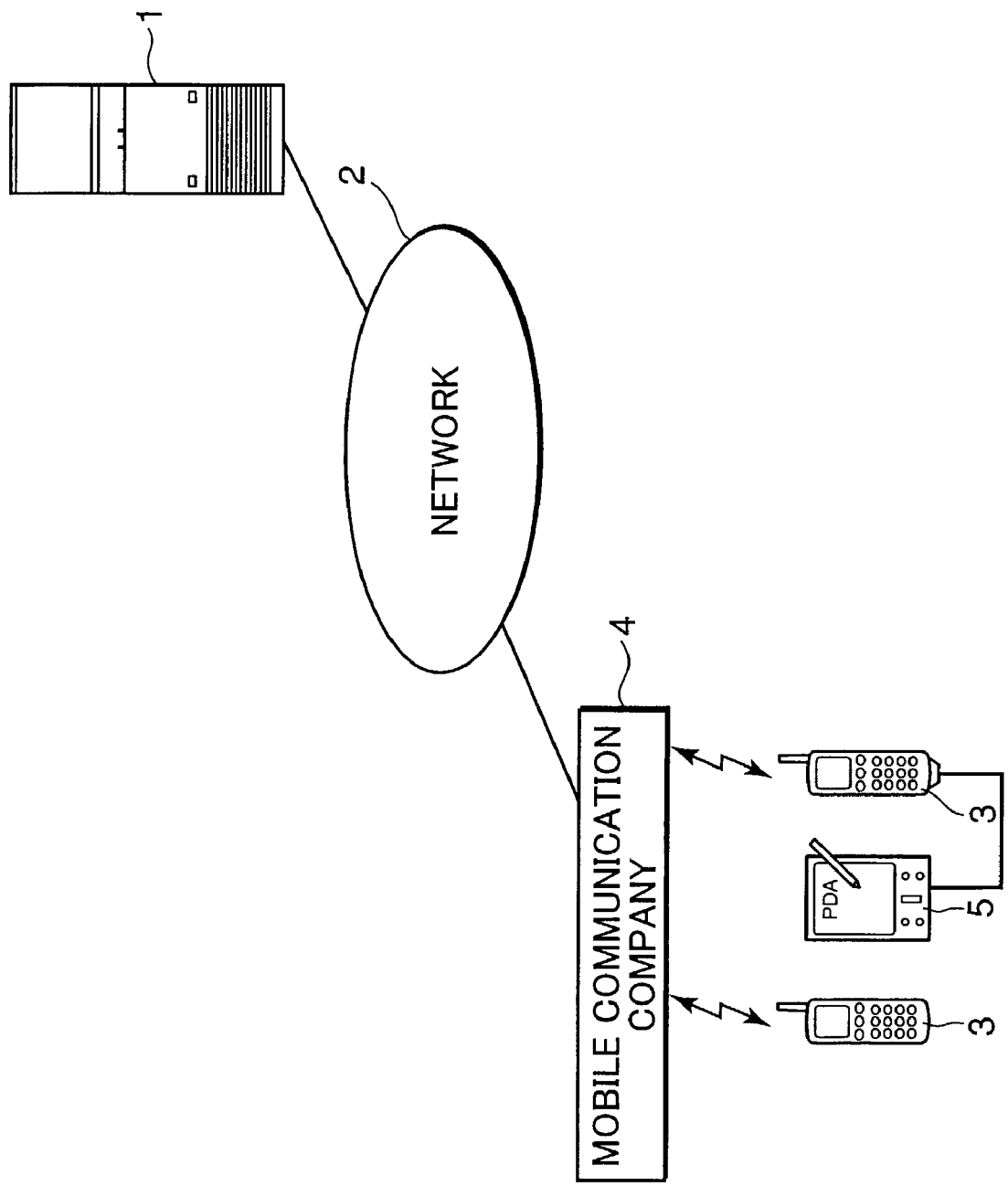
FIG. 1 is an overall diagram of an embodiment of a network game system employing a network game server 1 according to the present invention.

FIG. 1 is an overview of an embodiment of a network game system employing a network game server 1 according to the present invention. Network game server 1 shown in FIG. 1 controls the progress of the game and is installed on a network 2 constituted by the Internet. In this embodiment, a mobile telephone 3 is employed as the terminal device employed by the user; communication of mobile telephone 3 and network game server 1 is made possible by connection with network 2 through a prescribed mobile communication company 4 that acts as the provider for connection with network 2.

The terminal device is not restricted to the embodiment described above and a PDA 5 or the like connected to mobile telephone 3 could be employed; any terminal device, irrespective of type or mobile communication company where this is registered could be employed so long as it can use the same communication system.

Next, a detailed description of network game server 1 will be given. Network game server 1 is constituted of a WWW server device or the like and manages the progress of the game by performing transmission and reception through a network 2 of data of various types with mobile telephone 3 employed by the user.

Figure 2:
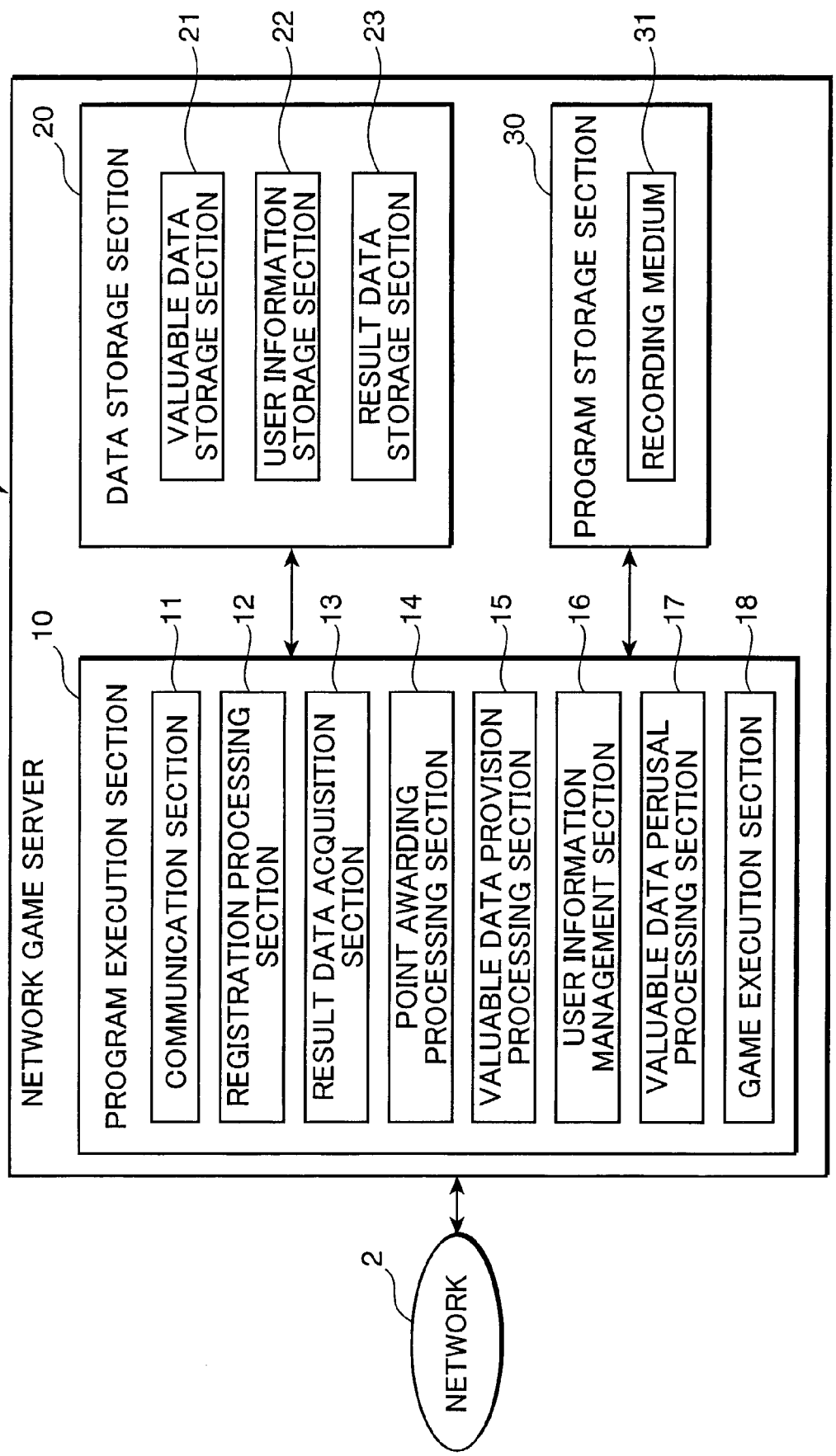
FIG. 2 is a functional block diagram illustrating the construction of network game server 1.

FIG. 2 is a functional block diagram illustrating the construction of network game server 1. As shown in FIG. 2, network game server 1 functionally includes a program execution section 10, data storage section 20 and program storage section 30. Program execution section 10 functionally includes communication section 11, registration processing section 12, result data acquisition section 13, point awarding processing section 14, valuable data provision processing section 15, user information management section 16, valuable data perusal processing section 17 and game execution section 18. Data storage section 20 includes valuable data storage section 21, user information storage section 22 and results data storage section 23. Program storage section 30 includes a computer-readable recording medium 31.

Program execution section 10 comprises a CPU (central processing unit) or the like of network game server 1. This CPU functions as communication section 11, storage processing section 12, results data acquisition section 13, point awarding processing section 14, valuable data provision processing section 15, user information management section 16, valuable data perusal processing section 17 and game execution section 18 by reading and executing various programs stored in recording medium 31 included in program storage section 30.

Communication section 11 is implemented by the CPU or the like running a communication program. Communication section 11 performs the necessary processing for performing transmission and reception of various types of data with mobile telephone 3. This communication section 11 comprises a function of receiving as prediction data a professional baseball team match result predicted by a user from mobile telephone 3, a function of receiving a request to provide valuable data (card image) whose provision is requested from a mobile telephone 3, a function of receiving a points exchange request made from mobile telephone 3 that requests exchange with points determined in accordance with this valuable data from the valuable data managed by a user information management section 16, to be described and a function of receiving a request made from mobile telephone 3 to peruse the valuable data supplied to the user.

Also, this communication section 11 has a function, under the control of a user information management section 16, to be described, if it concludes that the user employing a mobile telephone 3 has acquired points of at least a prescribed value (satisfying a prescribed condition), of notifying mobile telephone 3 that exchange of these points for valuable data is possible.

Furthermore, this communication section 11 has a function of providing in viewable form valuable data corresponding to a valuable data perusal request from mobile telephone 3.

Registration processing section 12 is implemented by CPU or the like executing a registration processing program. It registers (including altered/updated registration) in user information storage section 22, to be described, information relating to the user who employs mobile telephone 3. This registration processing section 12 has a function (predicted data registration means) of registering in association with the user who employs the mobile telephone 3 prediction data of winning or losing by professional baseball teams received by communication section 11 from mobile telephone 3. Also, registration processing section 12 functions as part of a game execution section 18, to be described. As will be described in detail later, the user information includes a nickname, supported team, rival team, mail address and password.

Results data acquisition section 13 is implemented by CPU or the like executing a results data acquisition program. Results data acquisition section 13 has a function (results data acquisition means) of acquiring as results data through network 2 the results that are actually generated in respect of the prediction data corresponding to the content of the user's predictions. Also, results data acquisition section 13 functions as part of game execution section 18, to be described.

Point awarding processing section 14 is implemented by CPU or the like executing a point awarding program. Point awarding processing section 14 uses game execution section 18, to be described, to enable the user employing mobile telephone 3 to execute a game capable of being run by one of the plurality of game programs stored on recording medium 31 included in program storage section 30 and stores (awards) points determined in accordance with the results of the game performed by the user in user information storage section 22.

Point awarding processing section 14 is provided with a function (point awarding means) of comparing results data acquired by results data acquisition section 13 and prediction data derived from the user and, if both these data satisfy prescribed conditions, of storing prescribed points in respect of the user who made the prediction in user information storage section 22; and is also provided with a function of deleting the valuable data stored in user information storage section 22, to be described, in response to a points exchange request from a mobile telephone 3 and storing points determined in accordance with this valuable data in user information storage section 22.

Valuable data provision processing section 15 is implemented by CPU or the like executing a valuable data provision program. Valuable data provision processing section 15 has a function (valuable data provision means) of providing to the user valuable data having a prescribed value, in accordance with the points. This valuable data provision processing section 15 has a function of storing in user information storage section 22 in association with the user information managed by the user information management section 16 valuable data in accordance with a valuable data provision request (card image provision request) received from a mobile telephone 3 by communication section 11. In addition, this valuable data provision processing section 15 has a function of performing subtraction processing of the points determined in accordance with the valuable data that have been provided from the acquired points stored in user information storage section 22, to be described, and storing the result in user information storage section 22.

Also, this valuable data provision processing section 15 has a function of storing in user information storage section 22, in association with the user, valuable data randomly selected from the valuable data stored in valuable data storage section 21, if the points managed by user information management section 16 satisfy a prescribed condition and notification of agreement to the exchange of the prescribed points for the valuable data has been received from mobile telephone 3.

User information management section 16 is implemented by the CPU or the like executing a user information management program. User information management section 16 manages in association with the user who employs the mobile telephone 3 the valuable data and the points acquired by the user within user information storage section 22, to be described. Also, this user information management section 16 has a function of ascertaining whether or not the user who employs mobile telephone 3 is already registered when access is received from mobile telephone 3.

Valuable data perusal processing section 17 is implemented by CPU or the like executing a valuable data perusal processing program. Valuable data perusal processing section 17, when a valuable data perusal request provided by valuable data provision processing section 15 is received from mobile telephone 3, performs prescribed data processing such as to ensure that this valuable data cannot be copied at mobile telephone 3.

Game execution section 18 is implemented by CPU or the like running a game execution program. Game execution section 18 enables the user to execute a game capable of being run by one of the plurality of game programs stored on recording medium 31 included in program storage section 30. Game execution section 18 has a function (first game execution means) of enabling a user to play a professional baseball match results prediction game continuing for a prescribed period and a function (second game execution means) of enabling a user to play a card-based game which is completed in a shorter time than the professional baseball match results prediction game. Also, when game execution section 18 is executing the professional baseball match results prediction game, the professional baseball match results prediction game is executed using registration processing section 12 and results data acquisition section 13, described above.

In this embodiment, the plurality of programs included in storage medium 31 of program storage section 30 are a program for enabling a user to execute the professional baseball match results prediction game and a program for executing the card-based game.

Data storage section 20 is constituted of non-volatile memory or the like such as a hard disk of network game server 1 and stores the necessary data for communication section 11, registration processing section 12, results data acquisition section 13, point awarding processing section 14, valuable data provision processing section 15, user information management section 16, valuable data perusal processing section 17 and game execution section 18 to perform various processing.

Valuable data storage section 21 stores the valuable data (card images) for perusal provision to mobile telephone 3 in association with the corresponding points. Valuable data storage section 21 is constituted so as to be capable of storing the valuable data in each team and each card rank.

User information storage section 22 stores the information relating to the user who uses the mobile telephone 3 registered by registration processing section 12 and stores, in association, the valuable data and points acquired by this user during the progress steps of the game.

Results data storage section 23 stores the results data acquired by results data acquisition section 13. Results data storage section 23 is constructed so as to be capable of accumulating and storing professional baseball match results data corresponding to the team supported by the user and a rival team.

Next, a mobile telephone 3 (terminal device) employed by a user will be described.

Figure 3:
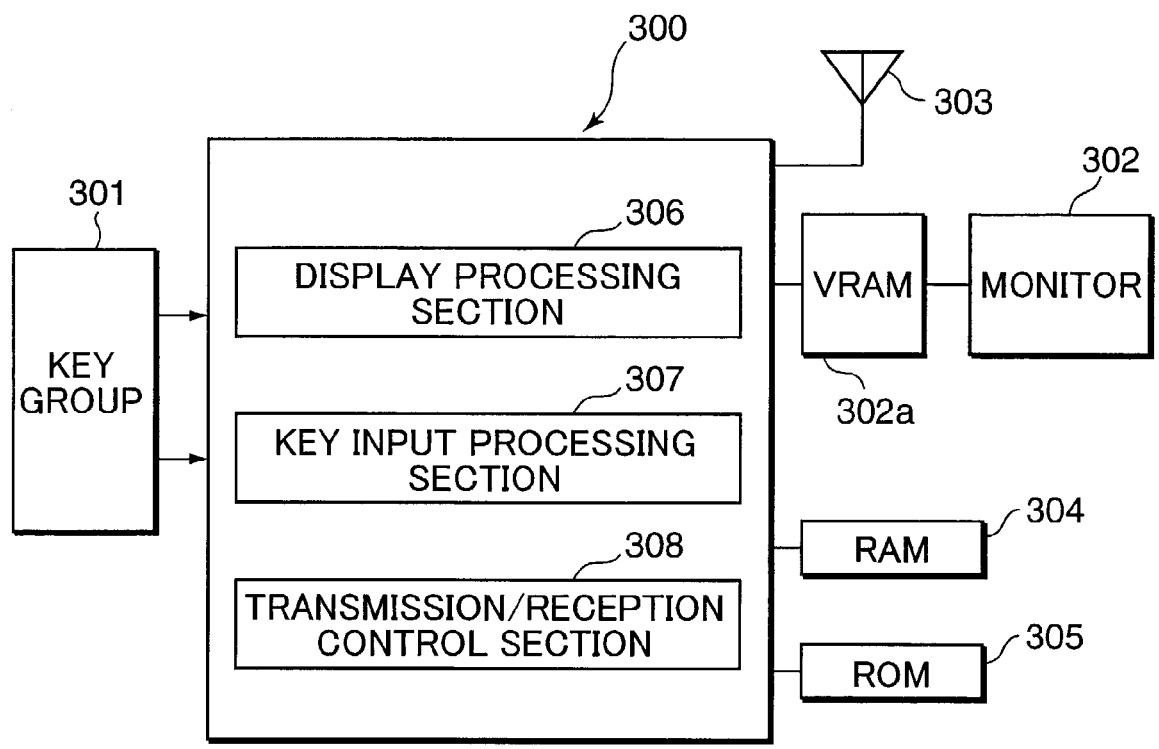
FIG. 3 is a block diagram of a mobile telephone 3 (terminal device) employed in this embodiment.

FIG. 3 is a block diagram of a mobile telephone employed in this embodiment and extracts for description in particular only those functions required in the present invention. Mobile telephone 3 comprises a control section 300 comprising a computer that controls the various sections in integrated fashion; this control section 300 is constituted by connecting a manual control member constituted by group of keys 301, VRAM 302a that stores image data to be displayed on monitor 302, antenna 303, RAM 304 that temporarily holds input data and/or processing data and ROM 305 that stores the control program.

Key group 301 comprises keys for telephone number input, function keys for movement of the cursor displayed on monitor 302 and/or for determining intention and a circuit on/off key or the like. It is also constituted to be capable of input of characters using the numeric keys, by setting of a function key, and is constituted to be thereby capable of input of mail data and mail addresses.

VRAM 302a temporarily stores the screen displayed on monitor 302 constituted by a liquid crystal display device or the like, effecting display by reading to monitor 302 the content that is written to VRAM 302a with a prescribed repetition period, so that this can be recognized as a static image by the residual image phenomenon.

The items from display processing section 306 to transmission/reception control section 308 that constitute control section 300 will now be described. Display processing section 306 provides confirmatory display of manual input operations, display of various types of input guide screen and/or display of image data or the like on the monitor and displays the content of mail. This display processing section 306 has the capacity to store at least one screen or more of image data and, for example in a condition in which only part of the image can be displayed on monitor 302, provides for the entire image to be viewed by arranging for the image to be scrolled upwards or downwards in response to operation of a specified key of key group 301. Key input processing section 307 compiles information in accordance with operation of key group 301.

Transmission and reception control section 308 performs circuit control of incoming calls from a wireless public switched circuit and outgoing calls and transmission and reception of audio data; in addition, it processes data transmission and reception of electronic mail employed for example through a network such as the Internet; the transmitted and received data is exchanged through antenna 303. The image data that is transmitted and received by mobile telephone 3 is communicated in packet form after being compressed for example in GIF format.

Next, the processing sequence performed by network game server 1 will be described using a flow chart and the like.

Before describing the processing sequence performed by network game server 1, an outline of the progress of a game according to this embodiment will be described. An outline of the progress of games in this embodiment is that a user accumulates points by playing a main game consisting in predicting professional baseball match results and a card-based mini-game and the user acquires card images of professional baseball players or the like in accordance with these points. Also the user can exchange acquired card image data of professional baseball players or the like and points. Also, the user can at any time use the monitor or the like of mobile telephone 3 to peruse in the manner of an electronic album the acquired card image data of die professional baseball players.

The professional baseball match results prediction game consists in that a user who wishes to participate in the game makes and registers a prediction in regard to the result of an actual professional baseball match. Then, when the match results are issued after the actual professional baseball match has been played, points are awarded to the user who made and registered the prediction, in accordance with the match result. The user accumulates points by repeating successful predictions and acquires card image data (valuable data) of professional baseball players or the like in accordance with these points. Also the professional baseball match results prediction game is a game in which the user is enabled to acquire points by the user continuing to play the game for a prescribed period.

The card-based game is a game that is completed in a shorter time than the professional baseball match results prediction game and functions as a supplementary method for acquiring points for acquiring card images of professional baseball players or the like by accumulating points obtained by the user selecting one card at a time on the screen that is displayed on the monitor of mobile telephone 3 or the like. Also, the card-based game is a game that is completed in a shorter time than the professional baseball match results prediction game.

In this embodiment, it may be supposed that, while the professional baseball match results prediction game is a game that may be played by the user during the season in which professional baseball is actually being played, the card-based game is a game that may be played by the user in the off-season, when professional baseball is not being played or on days when there are no matches, for example. However, by providing a prescribed condition (such as for example a condition that the mini-game can be played only once per day) it can be arranged for the user to play these two games concurrently.

First of all, the processing sequence performed by network game server 1 from user registration processing up to processing in respect of menu selection will be described.

Figure 4:
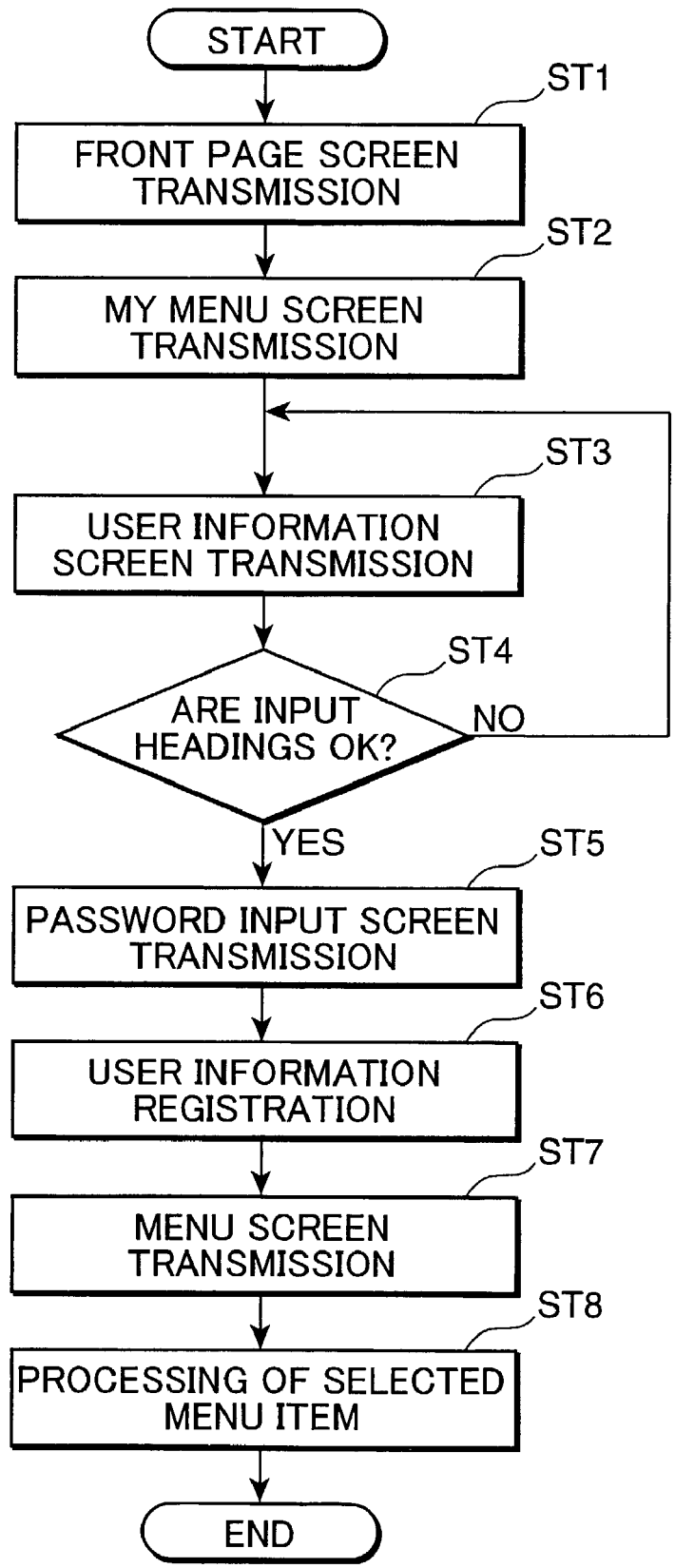
FIG. 4 is a flow chart illustrating an example of the processing procedure performed by network game server 1 from user registration processing up to the processing for menu item selection.
Figure 5:
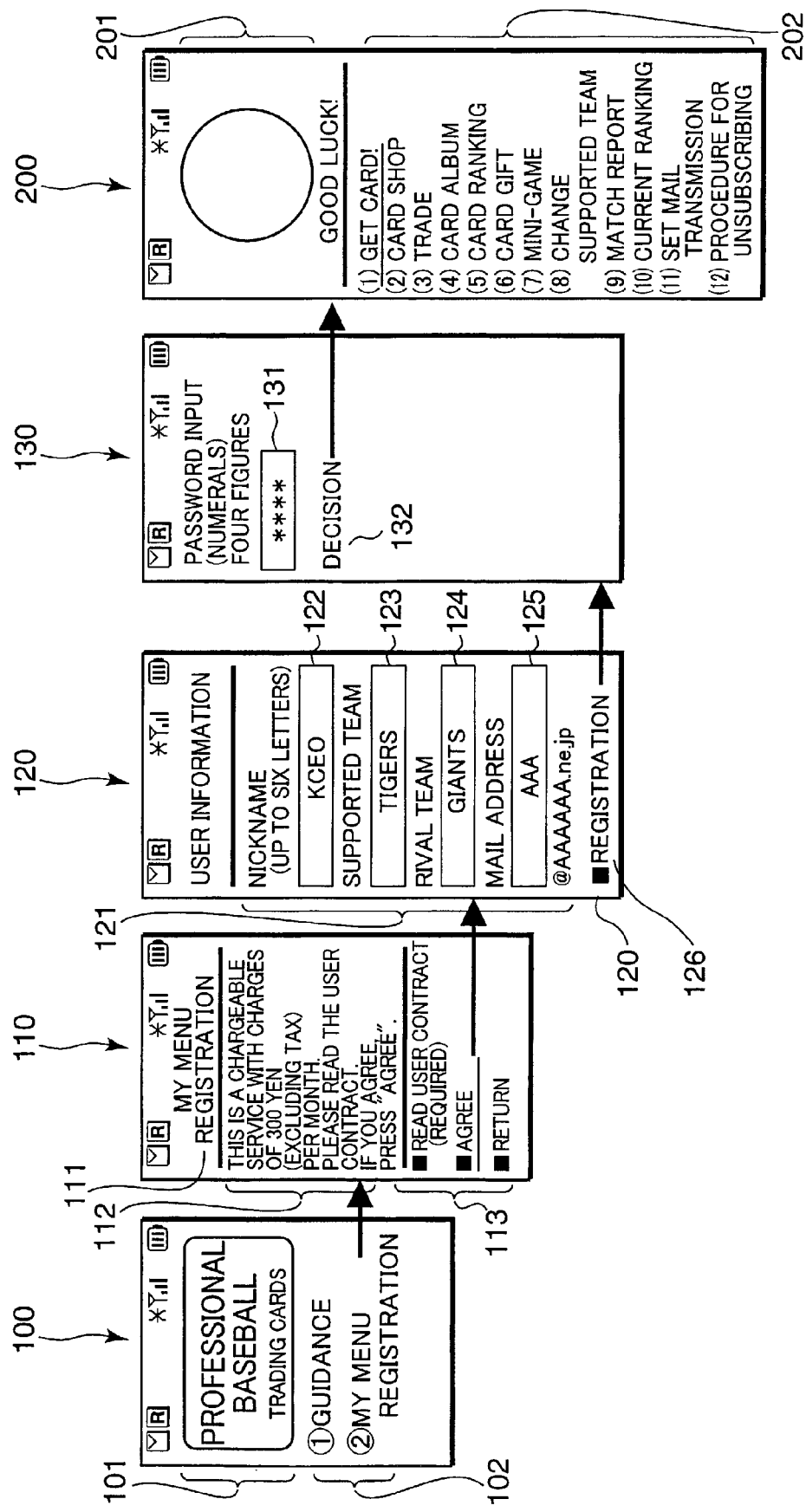
FIG. 5 is an example of a view of the changes of the screen displayed on mobile telephone 3 accompanying registration processing.

FIG. 4 is a flow chart showing an example of the processing sequence performed by network game server 1 from user registration processing up to processing in respect of menu selection. FIG. 5 shows an example of the changes of the screen displayed on mobile telephone 3 during user registration processing. The description is continued below with reference to FIG. 4 and FIG. 5 as appropriate. The arrows connecting the respective screens shown in FIG. 5, FIG. 8, FIG. 10, FIG. 12, FIG. 14 and FIG. 16 referred to below indicate movement of the screen displayed on mobile telephone 3 to the next screen in time sequence in accordance with the processing performed by network game server 1.

When network game server 1 receives access from mobile telephone 3, it transmits data to mobile telephone 3 (step ST1) for displaying front page screen 100, shown in FIG. 5, and this is thereby displayed.

As shown in FIG. 5, the front page screen 100 is constituted including a title image display section 101 that displays the title image of the current game and a menu item selection section 102 whereby menu items can be selected from two menu items: "(1) help" and "(2) my menu registration".

When network game server 1 receives notification of the selection of "(2) my menu registration" of front page screen 100 from mobile telephone 3 employed by a user who wishes to participate in the game, it sends data for displaying the "my menu" registration screen 110 shown in FIG. 5 to mobile telephone 3 (step ST2) and this is thereby displayed.

My menu registration screen 110, as shown in FIG. 5, includes a guidance display section 112 that displays guidance relating to my menu registration and a menu item selection section 113 whereby a single menu item can be selected from the three menu items: "read use agreement", "agree" and "return".

When network game server 1 receives from mobile telephone 3 notification of the selection of "agree" from the three menu items of menu item selection section 113 of my menu registration screen 110, it sends data for displaying user information screen 120 for input of the user information shown in FIG. 5 to mobile telephone 3 (step ST3), causing this to be displayed.

As shown in FIG. 5, user information screen 120 includes an input section 121 for inputting the four items of user information: "nickname" 122, "team supported" 123, "rival team" 124 and "mail address" 125 and a "register" button 126 for designating "my menu" registration after confirmation of input of the above items of input section 121.

In input section 121, "nickname" 122 is the nickname of the user in this game space. In this embodiment, network game server 1 manages the various items of user information by means of user information management section 16, so it is not possible to register a nickname which is the same as that of another user. This therefore means that it is not possible to employ a nickname which is already in use by another user. "Team supported" 123 means the supported professional baseball team registered by each user; in this embodiment, prescribed points are awarded when this supported team wins. It should be noted that the supported team could be the same as that supported by another user. "Rival team" 124 is a rival professional baseball team registered by each user; in this embodiment, prescribed points are awarded when this is beaten. It should be noted that, just as in the case of the supported team, the rival team could be the same as that of another user.

In this way, even if the prediction of victory/defeat of the supported team is falsified by the actual match results in respect of the prediction of victory/defeat, since a user can be awarded points by correctly predicting victory/defeat of a rival team, even users who support weak supported teams can be given plenty of opportunity to acquire points and the user's concerns and the game content can be linked; interest of the game can thereby be further improved.

"Mail address" 125 is the mail address of mobile telephone 3 employed by the user. This is employed for example by network game server 1 in sending various types of data to mobile telephone 3.

On receiving from mobile telephone 3 notification of input of the prescribed input items in input section 121 of user information screen 120 and depression of "register" button 126, network game server 1 ascertains (step ST4) whether or not the input items are correct, by means of registration processing section 12. Confirmation of the input items means identifying the case where the supported team and the rival team are the same or the case where the nickname has already been registered.

If, by means of registration processing section 12, network game server 1 identifies that the input items are incorrect (NO in step ST4), network game server 1 sends to mobile telephone 3 data for displaying a screen (not shown) to prompt re-input and when this is displayed returns to step ST3. Also, if network game server 1, by means of registration processing section 12, ascertains that the input items are correct (YES in step ST4), it sends to mobile telephone 3 data for displaying password input screen 130 (step ST5) for input of a password by the user, as shown in FIG. 5, and this is thereby displayed.

As shown in FIG. 5, password input screen 130 includes an input section 131 for input of a user password used when playing this game and a "confirmation" button 132 for confirming the input password.

On receiving the data that the password has been input to password input screen 130 from mobile telephone 3, network game server 1, using registration processing section 12, performs user registration (step ST6) of the user who is employing mobile telephone 3. When the user is registered, network game server 1 sends (step ST7) data for displaying menu screen 200 for selection by the user of the various menu items shown in FIG. 5 to mobile telephone 3, causing this to be displayed.

As shown in FIG. 5, menu screen 200 includes an insignia image display section 201 that displays an image of the insignia of the team supported by the user and a menu item selection section 202 whereby the user selects a desired menu item from 12 menu items.

On receiving from mobile telephone 3 notification of the selection of a menu item of menu item selection section 202 of menu screen 200, network game server 1 performs processing relating to these selected menu items (step ST8).

Next, the processing sequence performed by network game server 1 from acquisition of the result data in respect of the prediction data up to notification to the user of the increase of points will be described.

Figure 6:
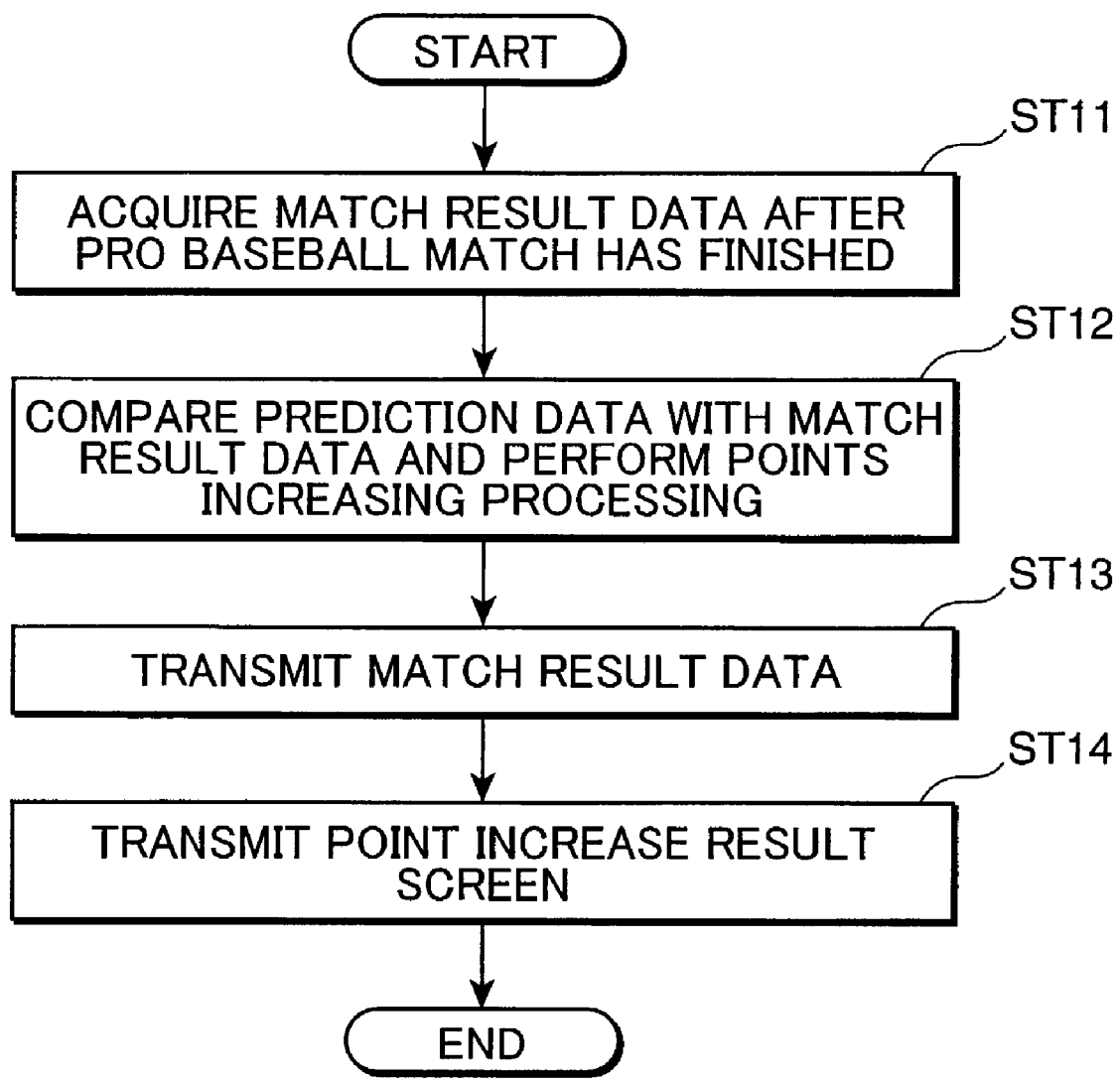
FIG. 6 is a flow chart illustrating an example of the processing procedure for results data acquisition in respect of prediction data performed by network game server 1.

FIG. 6 is a flow chart showing an example of the processing sequence in accordance with the acquisition of result data in respect of the prediction data carried out by network game server 1.

Using the result data acquisition section 13, network game server 1 acquires victory/defeat result data regarding victory/defeat of each of the teams which are the supported teams or rival teams of each user (step ST11).

Using point awarding processing section 14, network game server 1 compares the victory/defeat prediction data of the supported teams and rival teams of each user managed by user information management section 16 and the acquired match results data, and performs points increasing processing in respect of cases where the victory/defeat prediction data and the match result data agree and stores these in user information storage section 22 (step ST12).

Using communication section 11, network game server 1 sends to mobile telephone 3 (step ST13) the acquired match results data. If point awarding processing has been performed by point awarding processing section 14, network game server 1 sends (step ST14) to mobile telephone 3 data for displaying a points increase result screen (not shown), using communication section 11, and this is thereby displayed.

Next, the processing sequence performed by network game server 1 in accordance with the processing for providing valuable data will be described.

Figure 7:
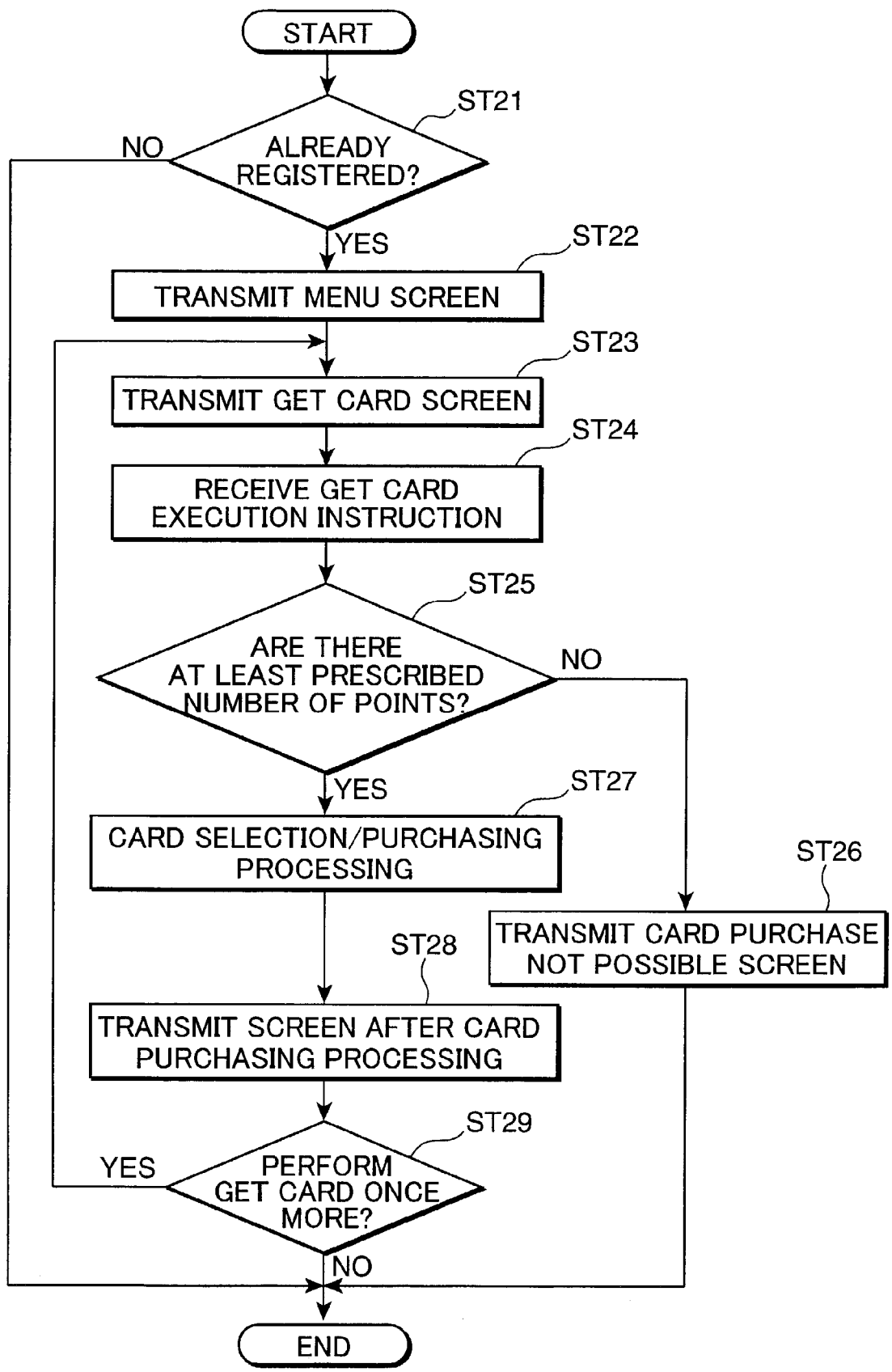
FIG. 7 is a flow chart showing an example of the processing procedure for providing valuable data performed by network game server 1.
Figure 8:
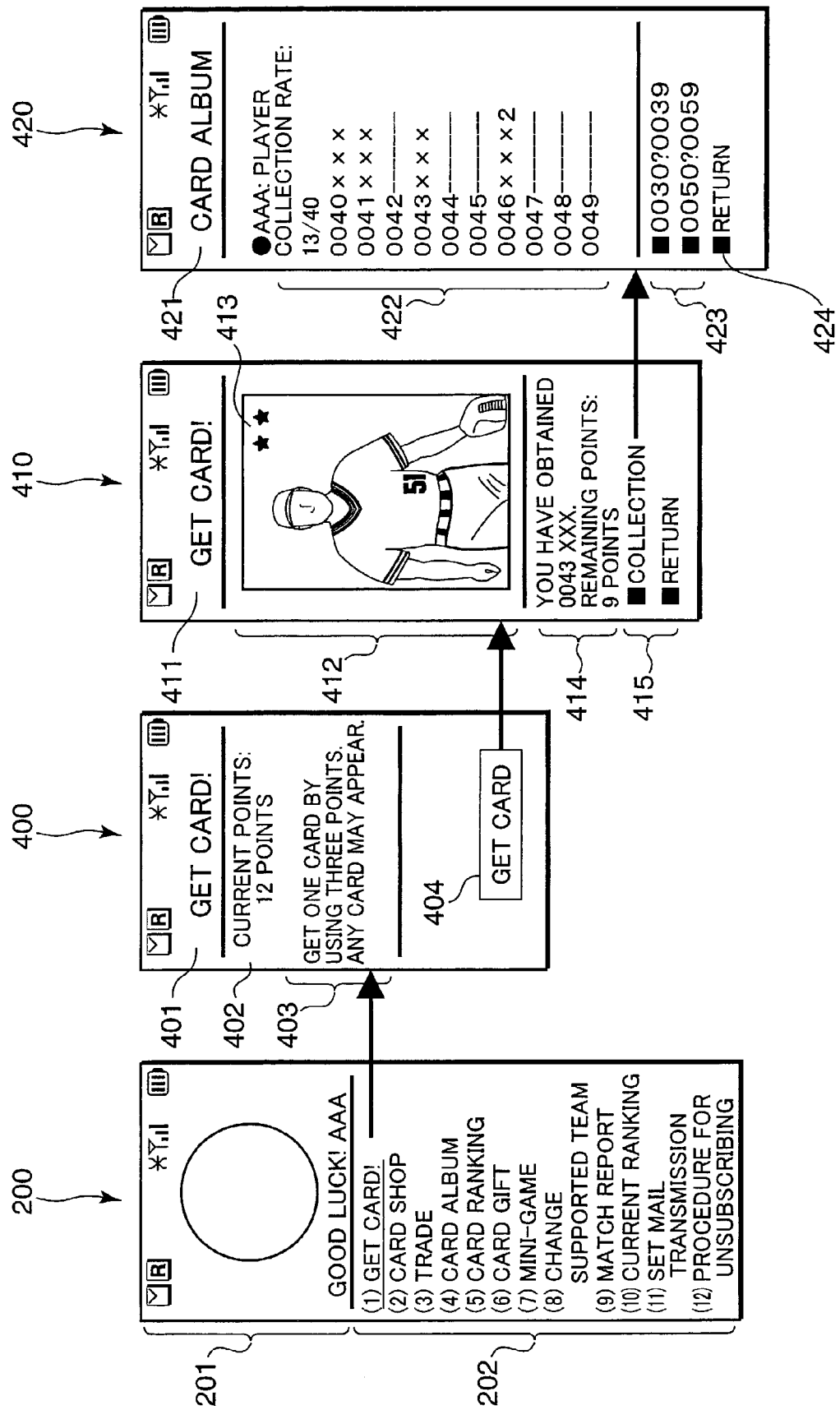
FIG. 8 is an example of a view of the changes of the screen displayed on mobile telephone 3.

FIG. 7 is a flow chart illustrating an example of the processing sequence in accordance with the processing for providing valuable data performed by network game server 1. FIG. 8 is an example of changed screen views displayed on mobile telephone 3 during processing for providing valuable data. The description is continued below with reference to FIG. 7 and FIG. 8 as appropriate.

On receiving access from a mobile telephone 3 employed by a user, network server 1 ascertains, using user information management section 16, (step ST21) whether or not the user employing mobile telephone 3 is the subject of an existing user registration. If, using user information management section 16, network game server 1 ascertains that the user is not registered (NO in step ST21), it sends to mobile telephone 3 data for displaying for example a notification screen (not shown) to the effect that user registration must be performed, and terminates the processing sequence.

Also, if, using user information management section 16, network game server 1 ascertains that the user is registered (YES in step ST21), it sends to mobile telephone 3 (step ST22) data for displaying menu screen 200, for selecting various types of menu item by the user, as shown in FIG. 8, causing this to be displayed. As shown in FIG. 8, menu screen 200 is the same screen as menu screen 200 shown in FIG. 5 described above, so description thereof is here omitted.

When network game server 1 receives notification from mobile telephone 3 of the selection of "(1) get card!" from the menu of menu item selection section 202 of menu screen 200, it sends data for displaying the get card screen 400 shown in FIG. 8 to mobile telephone 3 (step ST23), causing this to be displayed.

As shown in FIG. 8, get card screen 400 includes a selected menu item display section 401 that displays the currently selected menu item, a points display section 402 that displays the points currently acquired by the user, a guide section 403 that describes in simple terms the effect of "get card!", and a "get card" button 404 for executing "get card".

When network game server 1 receives from mobile telephone 3 notification that the execution button 404 displayed by "get card" of menu screen 400 has been pressed, using communication section 11, it receives (step ST24) from the mobile telephone 3 instructions for execution of "get card". Using user information management section 16, network game server 1 then reads from user information storage section 22 the points currently acquired by the user and ascertains whether or not these are greater than or equal to the prescribed points (step ST25).

If, using user information management section 16, network game server 1 ascertains that the current points of the user have not reached the prescribed number of points (NO in step ST25), using communication section 11, it sends (step ST26) to mobile telephone 3 data for displaying a "card purchase not possible" screen (not shown), causing this to be displayed and terminates the processing sequence.

Also, if, using user information management section 16, network game server 1 ascertains that the current number of points of the user is equal to or greater than the prescribed number of points (YES in step ST25), using valuable data provision processing section 15, it extracts a single item of valuable data randomly from the valuable data stored in valuable data storage section 21 and stores this extracted valuable data in association with the user in user information storage section 22 and subtracts from user information storage section 22 a number of points determined in accordance with the valuable data provided (step ST27).

Using valuable data perusal processing section 17, network game server 1 sends to mobile telephone 3 data for displaying an acquired card image screen 410 (screen after card purchase processing) after execution of "get card", processed so as to make the extracted valuable data shown in FIG. 8 viewable at mobile telephone 3 (step ST28), causing this to be displayed.

It should be noted that, when sending data for displaying the acquired card image screen (screen after card purchase processing) 410 to mobile telephone 3, network game server 1 sends this to mobile telephone 3 after performing prescribed data processing, by means of valuable data perusal processing section 17 such as to make it impossible for the card image to be copied at mobile telephone 3. Thereafter, when sending to mobile telephone 3 data for displaying a screen including a card image, network game server 1 uses valuable data perusal processing section 17 to send to mobile telephone 3 data for displaying a screen including a card image after performing prescribed data processing such as to make it impossible for the card image to be copied at mobile telephone 3. Consequently, illicit user actions such as copying card images at the user end can be prevented and the user can peruse the desired image data, so the game can be conducted in a troublefree fashion while satisfying the user's consciousness of possession of the card image.

As shown in FIG. 8, acquired card image display screen 410 includes a selected menu item display section 411 that displays the currently selected menu item, a card image display section 412 that displays the acquired card image, an acquired card image degree of difficulty display section 413, game condition display section 414 that displays the user's balance of points after "get card" and the identification number of the acquired card image, and a menu item selection section 415 whereby a single menu item may be selected from the two menu items "collection" and "return".

Acquired card image degree of difficulty display section 413 displays the degree of difficulty of acquiring this image data by displaying this for example by means of two stars displayed in the top right of the card image displayed in card display section 412. For example a single star indicates a normal card, two stars indicate a rare card, and three stars indicate an ultra-rare card. The larger the number of stars, the greater therefore is the difficulty for the user in acquiring the card. The number of card ranks is not restricted to three but could be more or less than this.

It should be noted that the indication of the degree of difficulty of acquisition (or rarity) of the card image is not restricted to the insignia referred to above displayed by card image degree of difficulty of acquisition display section 413 but could be achieved for example by other insignia or by altering the background color of card image display section 412. Furthermore, there is no restriction regarding the position of the insignia on the card image so long as this can be ascertained by the user from the monitor or the like of mobile telephone 3.

Thus, the user can appreciate the difficulty of acquiring card images which are few in number i.e. rare, so the interest of the game can be heightened and the user can be motivated to continue the game; thus smooth operation can be achieved with the game being played continuously.

When the user further performs the "get card" operation in order to acquire a card image, network game server 1, on receiving from mobile telephone 3 notification that the "return" button of menu item selection section 415 of acquired image display screen 410 shown in FIG. 8 has been pressed, transmits to mobile telephone 3 data for displaying the "get card" screen 400 shown in FIG. 8 (YES in step ST29), causing this to be displayed and the same sequence to be repeated by returning to step ST23. Network game server 1 then terminates the sequence of the series of processes, unless "get card" is again performed.

If it receives from mobile telephone 3 notification that the "collection" button of menu item selection section 415 of acquired card image display screen 410 shown in FIG. 8 has been selected, network game server 1 sends data for displaying card album screen 420 shown in FIG. 8 to mobile telephone 3, causing this to be displayed.

As shown in FIG. 8, card album screen 420 includes a selected menu item display section 421 that displays the currently selected menu item, an acquired card list display section 422 that displays a tabular list of card images currently acquired by the user, a group designation section 423 that designates a group of card images which are grouped with a prescribed classification (for example in teams) and a "return" button 424 for returning to the previous screen.

Acquired card list display section 422 displays a table of the card images acquired by the user at the current time point. AAA indicates for example the name of the professional baseball team. Also, in the collection rate, indicated by 13 (numerator)/40 (denominator), the denominator portion indicates the total of card images of players of team AAA already managed by network game server 1. The numerator portion indicates the acquired total of card images of players of team AAA acquired by the user at the current time point.

Also, in the acquired card list display section 422, in the portion 0040 XXX~0049 - - - , XXX indicates player names and the - - - portion indicates that, at the current time point, the user has not yet acquired a card image of this identification number. Consequently, since a display of the collection ratio is included in the screen displayed on mobile telephone 3, the user is able to grasp which are the card images which he has not yet been able to collect, by for example glancing at this. Also, the user can easily grasp the situation regarding collection of each team by displaying the collection rate for each professional baseball team.

Next, the processing sequence based on exchange of valuable data and points performed by network game server 1 will be described.

Figure 9:
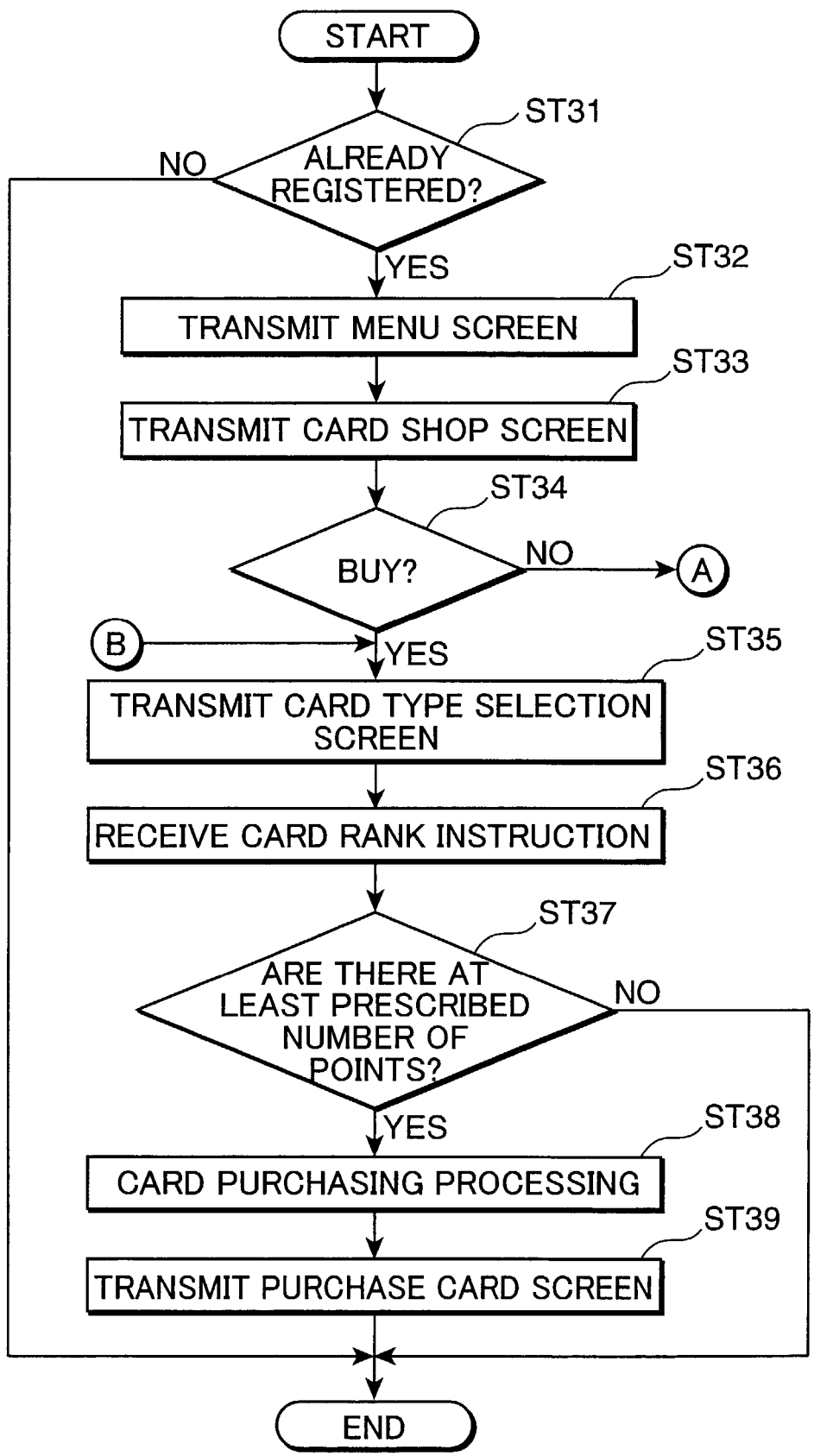
FIG. 9 is a flow chart illustrating an example of the processing procedure for exchange of valuable data and points performed by network game server 1.
Figure 10:
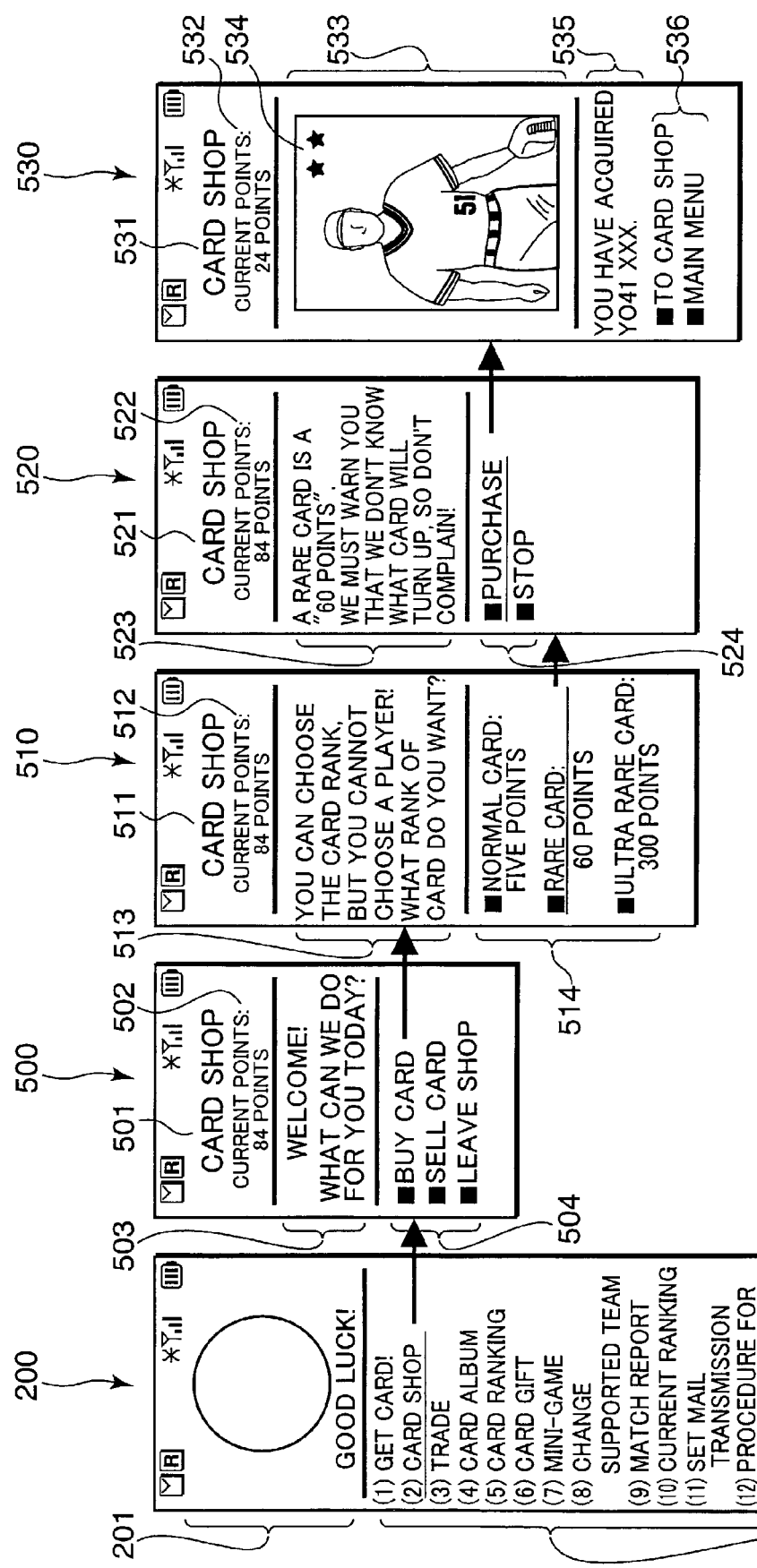
FIG. 10 is an example of the changes of the screen displayed on mobile telephone 3 during exchange of valuable data and points.

FIG. 9 is a flow chart showing an example of the processing sequence based on exchange of valuable data and points performed by network game server 1. FIG. 10 is an example of a view of the screen changes during exchange of valuable data and points displayed on mobile telephone 3. The description is continued below with reference to FIG. 9 and FIG. 10 as appropriate.

When network game server 1 receives access from mobile telephone 3 employed by a user, by means of user information management section 16, it ascertains (step ST31) whether or not the user employing mobile telephone 3 is already registered. If network game server 1 ascertains by means of user information management section 16 that the user is not registered (NO in step ST31), it sends data for displaying a notification screen (not shown) for example to the effect that user registration must be performed to mobile telephone 3 and terminates the processing sequence.

Also, if network game server 1 ascertains by user information management section 16 that the user is registered (YES in step ST31), it sends data for displaying menu screen 200 shown in FIG. 10 to mobile telephone 3 (step ST32) so that this is displayed. As shown in FIG. 10, menu screen 200 is the same screen as menu screen 200 shown in FIG. 5 and FIG. 8 described above, so description thereof is here omitted.

On receiving notification of selection of "(2) card shop" from menu item selection section 202 of menu screen 200 from mobile telephone 3, network game server 1 sends data for displaying card shop screen 500 shown in FIG. 10 to mobile telephone 3 (step ST33), causing this to be displayed.

As shown in FIG. 10, card shop screen 500 includes a selected menu item display section 501 that displays the currently selected menu item, a points display section 502 that displays the points currently acquired by the user, a guide section 503 to assist user input, and a menu item selection section 504 whereby a single menu item is selected from the three menu items "buy card", "sell card" and "leave shop".

When network game server 1 receives from mobile telephone 3 a selection instruction whereby "buy card" of menu item selection section 504 is selected (YES in step ST34), it sends to mobile telephone 3 (step ST35) data for displaying card type selection screen 510 for selection of the type (rank) of the card to be purchased, shown in FIG. 10, causing this to be displayed.

Figure 11:
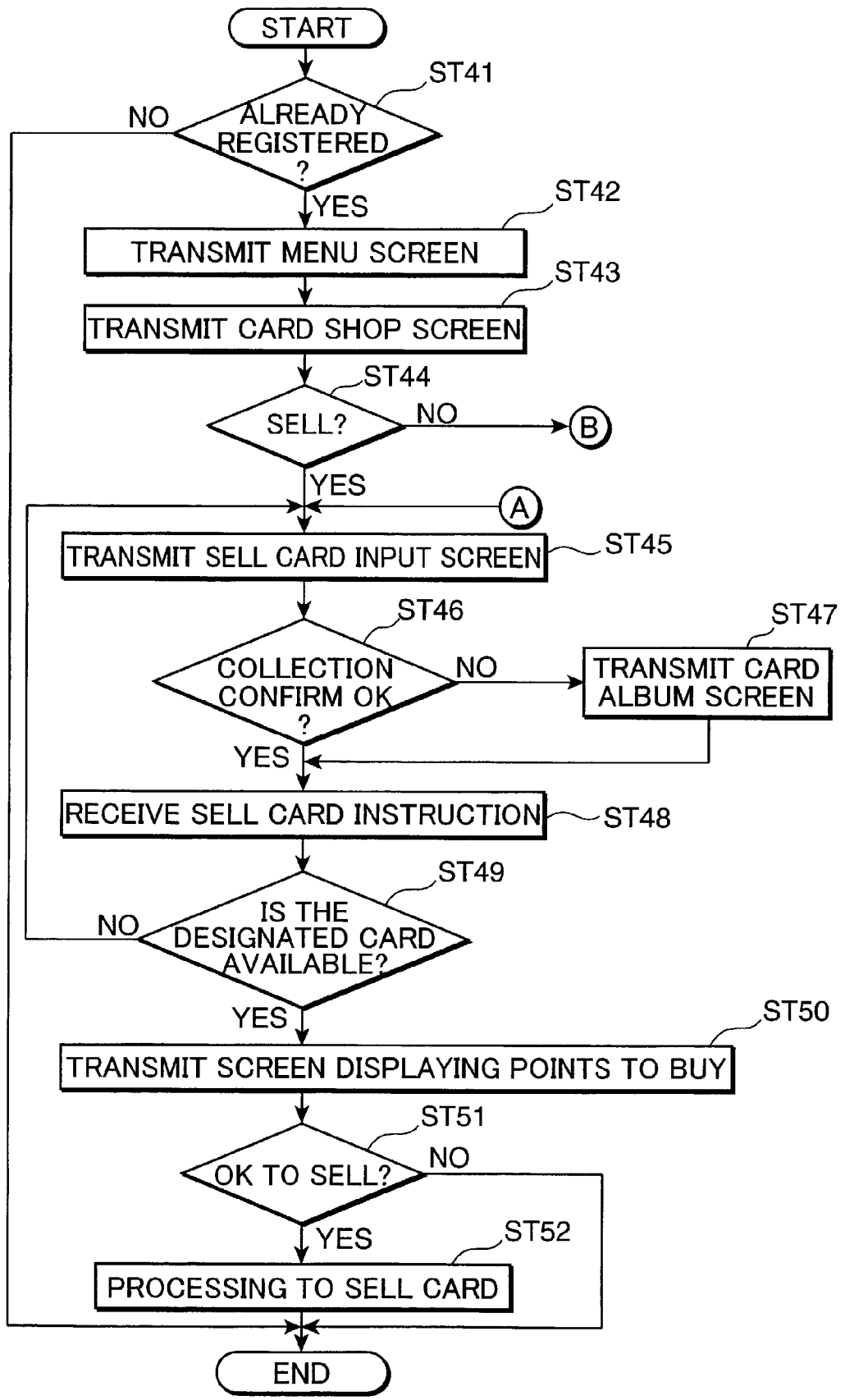
FIG. 11 is a flow chart illustrating an example of the processing procedure for exchange of valuable data and points performed by network game server 1.

Also, if network game server 1 receives a selection instruction that selects "sell card" menu item selection section 504 (NO in step ST34), it advances to A, shown in FIG. 11, to be described, and advances to step ST45. It should be noted that, if network game server 1 receives a selection instruction selecting "leave shop" of menu item selection section 504, the processing sequence performed by network server 1 is terminated.

As shown in FIG. 10, card type selection screen 510 includes a selected menu item display section 511 that displays the menu item that is currently selected, a points display section 512 that displays the points currently acquired by the user, a guide section 513 for assisting user input, and a menu item selection section 514 whereby a single menu item is selected from the three menu items: "normal card", "rare card" and "ultra-rare card".

The "normal card", "rare card" and "ultra-rare card" displayed by menu item selection section 514 are ranked in accordance with the points necessary to acquire these. For example, as displayed on menu item selection section 514, five points are required to acquire a "normal card", 60 points to acquire a "rare card" and 300 points to acquire an "ultra rare card", progressively more points being required in this order. The user can therefore easily imagine the value of the card image and, in addition, is motivated to acquire a desired card image by accumulating points.

When network game server 1 receives (step ST36) from mobile telephone 3 selection instructions of menu item selection section 514 to select a "rare card", by means of communication section 11, it sends to mobile telephone 3 data for displaying a card purchase intention confirmation screen 520 shown in FIG. 10 to confirm the user's intention to purchase the card and this is thereby displayed.

Card purchase intention confirmation screen 520 as shown in FIG. 10 includes a selected menu item display section 521 displaying the currently selected menu item, points display section 522 for displaying the points currently acquired by the user, guide section 523 for assisting user input in "card shop" and menu item selection section 524 for selecting a single menu item from the two menu items: "purchase" and "stop".

When network game server 1 receives a selection instruction to select "purchase" of the menu item selection section 524 of card type screen 520, network game server 1, by means of user information management section 16, reads the current number of points of the user from user information storage section 22 and ascertains whether this is or is not at least the prescribed number of points (step ST37).

If network game server 1 ascertains (NO in step ST37) by means of user information management section 16 that the user's current points have not reached the number of points laid down corresponding to the card rank to be purchased, by using communication section 11, it sends to mobile telephone 3 data for displaying for example a screen (not shown) to the effect that card purchase is not possible, causing this to be displayed; the processing sequence is then terminated.

Also, if network game server 1 ascertains by means of user information management section 16 (YES in step ST37) that the user's current points have reached the points laid down corresponding to the card rank that is to be purchased, it uses the valuable data provision processing section 15 to extract a single item of card image data randomly from the rank selected by the user and stored in valuable data storage section 21, stores the extracted valuable data in association with the user in user information storage section 22 and subtracts points corresponding to the valuable data thus provided and stores the result in the user information storage section 22 (step ST38).

Network game server 1 then uses communication section 11 to send (step ST39) to mobile telephone 3 data for displaying a purchased card screen 530 after execution of card purchase processing whereby the valuable data extracted is displayed in a fashion such that it can be perused at mobile telephone 3; this is thereby displayed and the processing sequence performed by network game server 1 is terminated. Even when sending to mobile telephone 3 data for displaying purchased card screen 530 shown in FIG. 10, network game server 1 sends the data for displaying a purchased card screen 530 including the card image to mobile telephone 3 by communication section 11 after performing prescribed data processing by means of valuable data perusal processing section 17 such as to prevent copying at mobile telephone 3, and this is thereby displayed.

As shown in FIG. 10, purchased card screen 530 includes a selected menu item display section 531 for displaying the currently selected menu item, a points display section 532 for displaying the points currently acquired by the user, a card image display section 533 for displaying the acquired card image, an acquired card data display section 535 for displaying the identification number of the acquired card image and a menu item selection section 536 for selecting a single menu item of the two menu items: "to card shop" and "to main menu". Also, the two stars displayed at the top right of the card image displayed in image display section 534 indicate the degree of difficulty of acquiring this image data; thus this is the same as the "get card" screen 410 shown in FIG. 8 after execution of "get card" as described above, so further description thereof is omitted.

Next, the processing procedure for exchange of valuable data and points performed by network game server 1 will be described.

FIG. 11 is a flow chart showing an example of a processing procedure for exchange of valuable data and points performed by network game server 1. FIG. 12 is an example of the change of screens displayed on mobile telephone 3 during exchange of valuable data and points. The description will be continued below with appropriate reference to FIG. 11 and FIG. 12.

When network game server 1 receives access from mobile telephone 3 employed by a user, by means of user information management section 16, it ascertains (step ST41) whether or not the user who is employing mobile telephone 3 is already registered. If network game server 1 ascertains by means of user information management section 16 that the user is not registered (NO in step ST41), it sends to mobile telephone 3 data for displaying for example a notification screen (not shown) to the effect that user registration should be performed, and terminates the processing sequence.

Also, if network game server 1 ascertains by means of user information management section 16 that the user is registered (YES in step ST41), it sends (step ST42) to mobile telephone 3 data for displaying menu screen 200 shown in FIG. 12, causing this to be displayed. Since, as shown in FIG. 12, menu screen 200 is the same as the menu screen 200 shown in FIG. 5, FIG. 8 and FIG. 10 described above, further description thereof is omitted.

When network game server 1 receives from mobile telephone 3 selection instructions to select "(2) card shop" of menu item selection section 202, it sends (step ST43) data for displaying card shop screen 500 shown in FIG. 12 to mobile telephone 3, causing this to be displayed. As shown in FIG. 12, card shop screen 500 has been described in FIG. 10, so further description thereof is omitted.

When network game server 1 receives selection instructions to select "sell card" of menu item selection section 504 of card shop screen 500 (YES in step ST44), using communication section 11, it sends data for displaying sell card input screen 550 shown in FIG. 12, for inputting of the number of the card to be sold, to mobile telephone 3 (step ST45) and this is thereby displayed.

Also, when network game server 1 receives selection instructions to select "buy card" of menu item selection section 504 of card shop screen 500 (NO in step ST44), it advances to B in FIG. 9. It should be noted that, if network game server 1 receives selection instructions to select "leave shop" of menu item selection section 504 of card shop screen 500, the processing sequence performed by network game server 1 is terminated.

As shown in FIG. 12, sell card input screen 550 includes a selected menu item display section 551 that displays the currently selected menu item, a points display section 552 that displays the points currently acquired by the user, a guidance section 553 for assisting user input, a card number input section 554 whereby the number of the card to be sold is input, and a menu item selection section 555 whereby a single menu item is selected from the two menu items "sell card" and "collection".

If the user does not know the number of the card to be sold in the card shop, when network game server 1 receives from mobile telephone 3 selection instructions to select "collection" of menu item selection section 555 (NO in step ST46) in sell card input screen 550, using communication section 11, it sends to mobile telephone 3 data for displaying card album screen 420, shown in FIG. 8, causing this to be displayed. Since card album screen 420 has been described above with reference to FIG. 8, further description thereof is omitted. The user can confirm which card image he has currently acquired by viewing this card album screen 420.

If network game server 1 has received selection instructions selecting "sell card" of menu item selection section 555 in sell card input screen 550 (YES in step ST46), using communication section 11, network game server 1 receives data indicating the card desired to be sold designated by the user (step ST48). Also, even if, in step ST47, selection instructions selecting "sell card" of menu item selection 555 in sell card input screen 550 are received from mobile telephone 3 after the user has confirmed the card image in card album screen 420, processing advances to step ST48.

Once network game server 1 has received an instruction designating sale of a desired card from mobile telephone 3, it uses user information management section 16 to determine (step ST49) whether or not the card designated by the user is stored in user information storage section 22. If it determines that the card designated by the user is stored in user information storage section 22 (YES in step ST49), network game server 1 sends data for displaying purchasing points display screen 560 shown in FIG. 12 to mobile telephone 3 (step ST50), causing this to be displayed.

As shown in FIG. 12, purchasing points display screen 560 includes a selected menu item display section 561 that displays the currently selected menu item, a points display section 562 that displays the points currently acquired by the user, a card number display section 563 that displays the card number input by the user, a purchase price display section 564 that displays the purchase price of the card input by the user, and a menu item selection section 565 that selects a single menu item from the two menu items "sell" and "stop".

Also, if network game server 1 determines, by using user information management section 16, that the card designated by the user is not stored in user information storage section 22 (NO in step ST49), it sends data for displaying error screen 570 shown in FIG. 12 to mobile telephone 3, causing this to be displayed, and returns to step ST45. The user must then again select a card image to be sold.

As shown in FIG. 12, error screen 570 includes a selected menu item display section 571 that displays the currently selected menu item, a points display section 572 that displays the points currently acquired by the user, a display section 573 for displaying whether or not a card has been acquired, that displays whether or not the user is in possession of the card image input by the user and a menu item selection section 574 that selects a single menu item of the two menu items "re-select number" and "collection".

When network game server 1 receives from mobile telephone 3 a selection instruction whereby "sell" of menu item selection section 565 of purchasing points display screen 560 shown in FIG. 12 is selected (YES in step ST51), using point awarding processing section 14, it deletes from user information storage section 22 the association of the card image designated by the user and performs processing to add to user information storage section 22 the points displayed in card acquisition display section 564 of purchasing points display screen 560 (step ST52).

Network game server 1 sends to mobile telephone 3 data for displaying sale confirmation screen 580 shown in FIG. 12, causing this to be displayed.

As shown in FIG. 12, sale confirmation screen 580 includes a selected menu item display section 581 that displays the currently selected menu item, points display section 582 that displays the points currently acquired by the user, awarded points display section 583 that displays the points awarded to the user and menu item selection section 584 that selects a single menu item from the two menu items "to card shop" and "to main menu".

Next, the processing sequence performed by network game server 1 in response to a request to peruse valuable data from the user will be described.

FIG. 13 is a flow chart illustrating an example of the processing sequence performed by network game server 1 in response to a valuable data perusal request from a user. FIG. 14 is an example of a view of the screen changes displayed on mobile telephone 3 on perusal of valuable data. The description will be continued hereinbelow with appropriate reference to FIG. 13 and FIG. 14.

When network game server 1 receives access from mobile telephone 3 employed by a user, by means of user information management section 16, it determines whether or not the user employing mobile telephone 3 is already registered (step ST61). If network game server 1 ascertains (NO in step ST61) by means of user information management section 16 that the user is not registered it sends to mobile telephone 3 data for displaying for example a notification screen (not shown) to the effect that user registration must be performed and terminates the processing sequence.

Also, if network game server 1 determines by means of user information management section 16 that the user is registered (YES in step ST61), it sends (step ST62) to mobile telephone 3 data for displaying menu screen 200 shown in FIG. 14, causing this to be displayed. As shown in FIG. 14, since menu screen 200 is the same as the menu screen 200 previously described and shown in FIG. 5, FIG. 8 and FIG. 10, further description thereof is omitted.

When network game server 1 receives (step ST63) from mobile telephone 3 a selection instruction that selects "(4) card album" from the menu item selection section 202 of menu screen 200, using communication section 11, it sends to mobile telephone 3 (step ST64) data for displaying acquired card list screen 600 shown in FIG. 14, causing this to be displayed.

As shown in FIG. 14, acquired card list screen 600 includes a menu item selection section 601 that displays the currently selected menu item, a collection rate display section 602 that displays the user's current rate of collecting card images and a team selection section 603 for selecting card images, classified by team.

Collection rate display section 602 displays the state of collection of card images acquired by the user at the current time point. If the collection rate is indicated by 82 (numerator)/1080 (denominator), the denominator portion indicates the total number of card images already managed by network game server 1. The numerator portion indicates the total number of collected card images acquired by the user at the current time point. Also, in the team selection section 603, T1 to T10 indicate the names of professional baseball teams.

When network game server 1 receives (step ST65) from mobile telephone 3 a request to peruse card image data relating to "T8" of team selection section 603 of acquired card list screen 600, using user information management section 16, it reads the card data already collected by the user corresponding to the perusal request stored in user information storage section 22 and sends to mobile telephone 3 (step ST66) data for displaying a card list screen 610 classified by team, shown in FIG. 14, causing this to be displayed.

As shown in FIG. 14, card list screen 610 classified by team includes a selected menu item display section 611 that displays the currently selected menu item, a collection rate display section 612 classified by team that expresses the user's current collection rate of card images for each team, a category heading display section 613 wherein the cards of teams corresponding to the user's perusal request are classified under headings for each category and a "return" button 614 for returning to the previous screen.

Collection rate display section 612 classified by team displays the state of collection of card images acquired by the user at the current time point. If the collection rate is expressed by 35 (numerator)/90 (denominator), the denominator portion indicates the total of card images of the team corresponding to the user's perusal request already managed at network game server 1. The numerator portion indicates the collected total of card images of the teams acquired by the user at the current time point. The category heading display section 613 indicates the type of card image, such as for example "team mascot/flag", "player/DB player" and "pawapurokun".

When network game server 1 receives from mobile telephone 3 a selection instruction that selects "player/DB player" of category heading display section 613 of card list screen 610 classified by team, it sends to mobile telephone 3 data for displaying collection condition display screen 620 classified by category shown in FIG. 14, causing this to be displayed.

As shown in FIG. 14, collection condition display screen 620 classified by category includes a selected menu item display section 621 that displays the currently selected menu item, a collection rate display section 622 classified by team that displays the current collection rate of the teams selected by the user, a number of cards collected display section 623 that displays the number of each card collected, a selection section 624 for displaying the number of cards collected for each card corresponding to the identification numbers thereof and a "return" button 625 for returning to the previous screen. The user can easily grasp which card images are duplicated by displaying the number of card images acquired in the form "0046 XXX 2/2 cards" in number of cards collected display section 623.

When network game server 1 receives from mobile telephone 3 a perusal request (step ST67) for perusing card images corresponding to "0046 XXX 2/2" of number of collected cards display section 623 of collection condition display screen 620 classified by category, by using communication section 11, it sends to mobile telephone 3 (step ST68) data for displaying card image display screen 630 that displays card images shown in FIG. 14 corresponding to the perusal request; and these are thereby displayed and the processing sequence performed by network game server 1 is terminated. By means of valuable data perusal processing section 17, network game server 1 sends the data for displaying card image display screen 630 shown in FIG. 14 to mobile telephone 3 by communication section 11 after performing prescribed data processing such that the data cannot be copied at mobile telephone 3.

As shown in FIG. 14, card image display screen 630 includes a selected menu item display section 631 that displays the currently selected menu item, display section 632 that displays a card image whose perusal is requested by the user, card identification information display section 634 that displays the identification number, player name and the like of the acquired card image, and a "return" button 635 for returning to the preceding screen. The card rank mark 633 (stars) in the top right of the card image displayed on card image display section 632 indicates the degree of difficulty of acquiring this card dala. In this case, there are two stars, indicating that this is a rare card.

Next, the processing sequence performed by network game server 1 for awarding of points by enabling the user to play the mini-game will be described.

FIG. 15 is a flow chart showing an example of the processing procedure performed by network game server 1 for awarding points by enabling the user to play the mini-game. FIG. 16 is an example of a view of screen changes displayed during playing of the mini-game on mobile telephone 3. The description will be continued below with appropriate reference to FIG. 15 and FIG. 16.

When network game server 1 receives access from a mobile telephone 3 employed by a user, using user information management section 16, it determines (step ST71) whether or not the user employing mobile telephone 3 is already registered. If network game server 1 determines (NO in step ST71) by means of user information management section 16 that the user is not registered it sends to the mobile telephone 3 data for displaying a notification screen (not shown) to the effect for example that user registration must be performed, and terminates the series of processes.

Also, if, by means of user information management section 16, network game server 1 determines (YES in step ST71) that the user is already registered, it sends to mobile telephone 3 (step ST72) data for displaying menu screen 200 shown in FIG. 16, causing this to be displayed. Since menu screen 200 shown in FIG. 16 is the same screen as menu screen 200 shown in FIG. 5, FIG. 8, FIG. 10, FIG. 12 and FIG. 14 described above, further description thereof is omitted.

When a network game server 1 receives from mobile telephone 3 selection instructions to select "(7) mini-game" from the menu item selection section 202 of menu screen 200, it sends to mobile telephone 3 (step ST73) data for displaying the mini-game screen (mini-game title screen) 700 for playing the mini-game shown in FIG. 16, causing this to be displayed.

As shown in FIG. 16, mini-game screen 700 includes a menu item selection display section 701 that displays the currently selected menu item, a guidance display section 702 that displays guidance regarding the content of the mini-game selected by the user, a menu item selection section 703 that selects a single menu item from the two menu items "(1) game start" and "(2) game explanation" and a "return" button 704 for returning to the previous screen.

When network game server 1 receives from mobile telephone 3 selection instructions selecting "(1) game start" from menu item selection section 703 of mini-game screen 700, it determines whether or not the points of the user employing mobile telephone 3 satisfy the prescribed condition (step ST74) by using game execution section 18. "Satisfying the prescribed condition" means for example that the user has already acquired the points necessary for playing the mini-game (for example three points).

If, by means of game execution section 18, network game server 1 determines (NO in step ST74) that the points of the user employing mobile telephone 3 do not satisfy the prescribed condition, it sends to mobile telephone 3 (step ST75) data for displaying a notification screen (not shown) to the effect that the mini-game is not available, indicating that the user cannot play the mini-game, causing this to be displayed and the series of processes performed by network game server 1 is then terminated.

If network game server 1 determines by means of game execution section 18 (YES in step ST74) that the points of the user employing mobile telephone 3 do satisfy the prescribed condition, it sends to mobile telephone 3 (step ST76) data for displaying card selection screen 710 for enabling the user to play the mini-game, by turning over the card on the screen shown in FIG. 16 and this is thereby displayed.

As shown in FIG. 16, card selection screen 710 includes playing procedure instructions section 711 that gives instructions to the user regarding the playing procedure on the screen of the mini-game, selected card display section 712 that arranges and displays a prescribed number (for example nine) of cards selected by the user, acquired points display section 713 that displays the points acquired by the user at the current time point and a "stop" button 714 for stopping the mini-game.

When network game server 1 receives (step ST77) from mobile telephone 3 selection instructions selecting one of the nine cards of selected card display section 712 of card selection screen 710, using game execution section 18, it determines (step ST78) whether or not the card in accordance with the selection instructions is an OUT card indicating termination of the mini-game.

When network game server 1, using game execution section 18, determines (NO in step ST78) that the card designated by the selection designation is an OUT card, it advances to step ST81, to be described. Also, if network game server 1, using game execution section 18, determines (YES in step ST78) that the card designated by the selection designation is a card other than an OUT card, it stores in user information storage section 22 points determined in accordance with the card designated by the selection designation by point awarding processing section 14 and sends (step ST79) to mobile telephone 3 data for displaying card selection screen 720 shown in FIG. 16 in which the points acquired by the user are displayed, causing this to be displayed.

As shown in FIG. 16, card selection screen 720 includes a playing procedure instructions section 721 for giving instructions to the user concerning the playing procedure on the screen of the mini-game, a selected card display section 722 that arranges and displays the cards selected by the user and a prescribed number (for example eight) of unselected cards, and acquired points display section 723 that displays the points acquired by the user at the current time point and a "stop" button 724 for stopping the mini-game. In selected card display section 722, for cards which have already been selected, the points (for example one point or the like) determined in accordance with this card are displayed as points acquired by the user.

When network game server 1 receives (step ST80) from mobile telephone 3 selection instructions selecting one of the remaining eight cards of selected card display section

722 of card selection screen 720, using game execution section 18, it returns to step ST76 and repeats the above procedure. Also, when it network game server 1 receives from mobile telephone 3 notification of the fact that the "stop" button 724 of card selection screen 720 has been selected (NO in step ST80), using the game execution section 18, it sends to mobile telephone 3 (step ST81) data for displaying mini-game termination screen 730 indicating the termination of the mini-game, shown in FIG. 16, causing this to be displayed, after which the series of processes performed by network game server 1 is terminated.

As shown in FIG. 16, card selection screen 730 includes a mini-game termination display section 731 indicating termination of the mini-game, selected card display section 732 that arranges and displays the cards selected by the user and a prescribed number of (for example seven) of cards that have not yet been selected, acquired points display section 733 that displays the points acquired by the user at the current time point and a "stop" button 734 for stopping the mini-game.

In selected card display section 732, in the cards which have already been selected, the points determined in accordance with these cards (for example one point) and "OUT" indicating termination of the mini-game are displayed as the results of the user playing the mini-game. If "OUT" is not displayed in selected card display section 732, the user can continue to select cards (for example the remaining seven cards) until "OUT" is displayed and so can continue the mini-game; however, if "OUT" is displayed, points collected up to this point are forfeited, so the user must take care not to end up with zero points by being too greedy. Thus, since points of the numerical value displayed are awarded by selection of cards desired by the user in selected card display sections 712 and 722, the user can acquire a large number of points by playing the mini-game once, if things go well.

In the selected card display sections 712, 722 and 732 described above, the points of the card selected by the user determined in accordance with each card as for example: one point, two points, or three points are predetermined. However, the points determined in accordance with each card are not restricted to those of the embodiment described above and cards could be included whereby for example the acquired points are doubled. In this case, in the event of the second and subsequent card selections by the user, points are awarded to the user by multiplying the acquired points up to this point by two, but if this card is selected as the first card, since there are not yet any acquired points, zero is multiplied by two so no points can be acquired. Cards could also be included whereby points are subtracted from the selected cards.

As described above, in FIG. 15 and FIG. 16, network game server 1, by using game execution section 18, conducts advancement of a game in which points are acquired by the user being enabled to play a card turnover game (mini-game) capable of being run by a card turnover game execution program stored in storage medium 31 included in program storage section 30.

As described above, with the present invention, since a plurality of methods of acquiring card images by the user can be provided, card image acquisition by the user can be facilitated and the user's feeling of improvement of acquisition rate of desired card images can be increased in accordance with the degree of progress of the game, so the user can be induced to play the game continuously.

Also, since the user can choose a game of the desired type in accordance with his own preferences and/or convenience, the game does not become monotonous and the user can be made to play the game continuously.

The user can also be induced to play the game continuously by the fact that one of the two games is given the role of supplementing periods in which the other game cannot be played.

Also, since the user can make predictions regarding phenomena in the real world that are complex and difficult to predict, such as predictions of winning/losing in regard to match results of professional baseball for example and the user's feeling of anticipation regarding acquisition of the card images to be finally provided can be increased, the interest of the game itself can be improved and, since the user can acquire desired card images by continuously increasing his points, the user can be given a continuous feeling of expectation of acquiring desired card images in accordance with the degree of progress of the game.

In summary, the present invention relates to a network game server device that conducts a game in which a user is enabled to acquire valuable data having a prescribed value by performing transmission/reception of data with a terminal device employed by the user through a network, comprising: game execution means for enabling the user to play a single game of a plurality of games; point awarding means that awards prescribed points to this user in accordance with the results of a game played by the user using said game execution means; and valuable data provision means that provides to this user valuable data having a prescribed value in accordance with the points awarded to the user by said point awarding means.

With the aforementioned invention, a network game server device that conducts a game in which a user is enabled to acquire valuable data having a prescribed value by performing transmission/reception of data with a terminal device employed by the user through a network, comprises: game execution means for enabling the user to play a single game of a plurality of games; point awarding means that awards prescribed points to this user in accordance with the results of a game played by the user using the game execution means; and valuable data provision means that provides to this user valuable data having a prescribed value in accordance with the points awarded to the user by the point awarding means.

That is, the user is enabled to play a single game of a plurality of games, this user is awarded prescribed points in accordance with the results of the game played by the user and valuable data having a prescribed value in accordance with the awarded points is provided to this user. In this way, since a plurality of games are provided whereby the points needed for acquiring valuable data having a prescribed value can be acquired, a plurality of methods of acquisition of the valuable data by the user can be provided. Also, since, rather than providing the valuable data directly to the user by playing the game, points needed for acquiring the valuable data are awarded, the feeling of anticipation of the user of for example increasing the rate of acquisition of valuable data in accordance with the degree of progress of the game can be increased. As a result, the user can be provided with a plurality of methods of acquiring valuable data, so acquisition of valuable data by the user can be facilitated and the user's feeling of anticipation of improving the rate of acquisition of desired valuable data can be increased in accordance with the degree of progress of the game, so the user can be induced to play the game continuously.

In the above described network game server device, said game execution means may include first game execution means for enabling the user to play a first game continuing for a prescribed period; and second game execution means for enabling the user to play a second game that is concluded in a shorter period than said first game.

With the above described features in the network server device, the game execution means includes: first game execution means for enabling the user to play a first game continuing for a prescribed period; and second game execution means for enabling the user to play a second game that is concluded in a shorter period than said first game. That is, the user can play a first game continuing for a prescribed period and can also play a second game that terminates in a shorter period than the first game. In this way, the user can choose a desired type of game in accordance with his own preferences and/or convenience, since a plurality of games of two different characteristics can be played, namely, a first game that needs to be continued for a prescribed period and a second game that terminates in a shorter period than the first game. As a result, the user can select a game of a desired type in accordance with his own preferences and/or convenience or the like, so the game does not become monotonous and the user can be made to play the game continuously.

In the above described network game server device, said second game may include a game capable of being played in a period in which said first game is incapable of being played.

With the above features in a network game server device, said second game includes a game capable of being played in a period in which said first game is incapable of being played. Specifically, the first game has a period of being incapable of being played in which this first game is incapable of being played but the second game includes a game capable being played in this period in which the first game is incapable of being played, so the user can play a plurality of games, namely, a first game having a period in which it is incapable of being played and a second game that is capable being played in the period in which the first game is incapable of being played. Thus, since points can be acquired by playing the second game when the user cannot play the first game in the period in which it is incapable being played, one of the games of these two games can be given the role of supplementing the period in which the other game is incapable of being played. As a result, one of the two games can be given the role of supplementing periods in which the other game cannot be played, so the user can be induced to play the game continuously.

In addition, said first game execution means may include prediction registration means that receives from said terminal device prediction data corresponding to the content of a prediction by the user regarding an actual phenomenon that may occur in the future and that registers the received prediction data in association with this user; and result data acquisition means that acquires the phenomenon that actually occurs in respect of said prediction data as result data; and said point awarding means awards prescribed points to the user registered in association with this prediction data if said prediction data and the result data satisfy a predetermined condition.

With the above described features, specifically, prediction data corresponding to a content of a user's prediction in respect of an actual phenomenon that may occur in the future is received from the terminal device, the received prediction data is registered in association with this user and the phenomenon that actually occurs in respect of the registered prediction data is acquired as result data. Then, if the registered prediction data and the result data satisfy a predetermined condition, prescribed points are awarded to the user registered in association with this prediction data. In this way, since the user employing the terminal device is allowed to make, as a game, predictions regarding actual phenomenon that may occur in the future, the user can make predictions regarding phenomena in the real world that are complex and difficult to predict and that cannot necessarily be controlled by human beings, rather than phenomena created artificially in virtual space such as game space. Also, since, if the user's prediction satisfies the predetermined condition with the actually occurring result, rather than directly providing the valuable data, the valuable data is provided through the intermediary of an intermediate object capable being increased or decreased, namely, points, difficulty in acquiring the valuable data can be added. Consequently, the user's feeling of value in respect of the valuable data that are finally provided can be increased, so the user's feeling of anticipation regarding acquisition of the valuable data can be increased.

Furthermore, since, by the user continuing to play the game, points can be increased every time the user's prediction and the actually occurring result satisfy a predetermined condition, desired valuable data can be acquired by continuous increase of points. As a result, a user can make predictions concerning phenomena in the real world that are complex and difficult to predict and that cannot necessarily be controlled by human beings and the user's feeling of anticipation regarding acquisition of valuable data to be finally provided can be increased, so the interest of the game itself can be increased and, since the user can acquire desired valuable data by continuously increasing his points, the user can be continuously given a feeling of expectation of being able to acquire desired valuable data in accordance with the degree of progress of the game.

The present invention also relates to a method of controlling progress of a network game wherein progress of the network game is controlled using a network game server device that executes a game in which users are enabled to acquire valuable data having a prescribed value by performing transmission and reception of data with a plurality of terminal devices employed by users through a network, comprising the steps of: game execution step in which said network game server device enables a user to play a single game of a plurality of games; point awarding step in which said network game server device awards prescribed points to this user in accordance with the results of a game played by the user in said game execution step; and valuable data provision step in which said network game server device provides to this user valuable data having a prescribed value in accordance with the points awarded to the user in said point awarding step.

Thus, with the present invention as described in the above, a method of controlling progress of a network game wherein progress of the network game is controlled using a network game server device that executes a game in which users are enabled to acquire valuable data having a prescribed value by performing transmission and reception of data with a plurality of terminal devices employed by users through a network, includes: a game execution step in which the network game server device enables a user to play a single game of a plurality of games; a point awarding step in which the network game server device awards prescribed points to this user in accordance with the results of a game played by the user in the game execution step; and a valuable data provision step in which the network game server device provides to this user valuable data having a prescribed value in accordance with the points awarded to the user in the point awarding step.

That is, by means of the network game server device, a user is allowed to play a single game of a plurality of games and prescribed points are awarded to this user in accordance with the results of the game played by the user, and this user is provided with valuable data having a prescribed value in accordance with the awarded points. In this way, since a plurality of games are provided whereby points can be acquired required for acquiring valuable data having a prescribed value, the user is provided with a plurality of methods of acquiring the valuable data. Also, since the user is awarded the points needed for acquiring the valuable data rather than directly providing the valuable data by playing the game, the user's feeling of anticipation of improvement and the like of the rate of acquiring valuable data can be increased in accordance with the degree of progress of the game. Accordingly, the user can be provided with a variety of methods of acquiring valuable data, so acquisition of valuable data by the user can be facilitated and the user's feeling of expectation of for example being able to increase the rate of acquisition of desired valuable data can be increased in accordance with the degree of progress of the game, so the user can be induced to play the game continuously.

The present invention also relates to a network game progress control program for controlling progress of a network game using a network game server device that executes a game in which users are enabled to acquire valuable data having a prescribed value by performing transmission and reception of data with a plurality of terminal devices employed by users through a network wherein said network game server device is made to function as: game execution means for enabling a user to play a single game of a plurality of games; point awarding means that awards prescribed points to this user in accordance with the results of a game played by the user using said game execution means; and valuable data provision means that provides valuable data having a prescribed value to this user in accordance with the points awarded to the user by said point awarding means.

With the present invention as set out in the above, a network game progress control program for controlling progress of a network game using a network game server device that executes a game in which users are enabled to acquire valuable data having a prescribed value by performing transmission and reception of data with a plurality of terminal devices employed by users through a network makes the network game server device function as: game execution means for enabling a user to play a single game of a plurality of games; point awarding means that awards prescribed points to this user in accordance with the results of a game played by the user using the game execution means; and valuable data provision means that provides valuable data having a prescribed value to this user in accordance with the points awarded to the user by the point awarding means.

Specifically, by means of the network game server device, a user is allowed to play a single game of a plurality of games and prescribed points are awarded to this user in accordance with the results of the game played by the user and valuable data having a prescribed value is provided to this user in accordance with the awarded points. In this way, since a plurality of games are provided whereby points can be acquired needed for acquiring valuable data having a prescribed value, the user is provided with a plurality of methods of acquiring the valuable data. Also, since points are awarded required for acquiring the valuable data rather than the valuable data being directly provided to the user by playing the game, the user's feeling of anticipation of increase of rate of acquisition of valuable data and the like can be increased in accordance with the degree of progress of the game. As a result, the user can be provided with a plurality of methods of acquiring valuable data, so acquisition of valuable data by the user can be facilitated and the user's feeling of anticipation of for example increase in the rate of acquisition of desired valuable data can be increased in accordance with the degree of progress with the game, so the user can be induced to play the game continuously.

This application is based on Japanese Patent Application serial no. 2001-205226 filed in Japan Patent Office on Jul. 5, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from, the scope of the present invention hereinafter defined, they should be construed as being included therein.

What is claimed is:

1. A network game apparatus comprising:
   a network game server device that conducts a game in which a user is enabled to acquire valuable data having a prescribed value by performing transmission and reception of data with a terminal device employed by the user through a network;
   the network game server device comprising:
   game execution means for enabling the user to play a single game out of a plurality of games;
   point awarding means for awarding prescribed points to the user in accordance with the results of a game played by the user using said game execution means;
   prediction data registration means for receiving from said terminal device prediction data corresponding to the content of a prediction by the user regarding an actual phenomenon that may occur in the future and that registers the received prediction data in association with the user;
   result data acquisition means for acquiring the phenomenon that actually occurs in respect of said prediction data as result data;
   said point awarding means awards the prescribed points to the user registered in association with the prediction data if said prediction data and the result data satisfy a predetermined condition;
   valuable data provision means for enabling exchange of accumulated points for game related prizes of differing value in accordance with the points awarded to the user by said point awarding means, the game related prizes being provided in the form of the valuable data; and
   said point awarding means enabling exchange of accumulated prizes for points by deleting a designated prize and increasing the accumulated points of the user by an amount associated with the designated prize.

2. The network game apparatus of claim 1, wherein:
   said game execution means includes a first game execution means for enabling the user to play a first game continuing for a prescribed period; and
   a second game execution means for enabling the user to play a second game that is concluded in a shorter period than said first game.

3. The network game apparatus of claim 2, wherein said first game execution means and said second game execution means enables said second game capable of being played in a period in which said first game is incapable of being played.

4. The network game apparatus of claim 1, wherein:
said valuable data exists stored on said network game server device after completion of and outside of said game played by said user, and is accessible for viewing via the terminal;
said valuable data provision means operates to exchange said accumulated points after completion of and outside of said game played by said user; and
said point awarding means enables exchange of the accumulated prizes after completion of and outside of said game played by said user.

5. The network game apparatus of claim 1, wherein said valuable data includes a card data representing a collectible card having a value based at least in part on rareness of the collectible card, appreciation of said card data by said user being limited to viewing via a terminal accessing said network game server.

6. A method of controlling progress of a network game, using a network game server device that executes a game in which users are enabled to acquire valuable data having a prescribed value by performing transmission and reception of data with a plurality of terminal devices employed by the users through a network, said method comprising:
a game execution step in which said network game server device enables a user to play a single game of a plurality of games;
a point awarding step in which said network game server device awards prescribed points to the user in accordance with the results of a game played by the user in said game execution step;
prediction data registration step for receiving from said terminal device prediction data corresponding to the content of a prediction by the user regarding an actual phenomenon that may occur in the future and that registers the received prediction data in association with the user;
result data acquisition step for acquiring the phenomenon that actually occurs in respect of said prediction data as result data;
said point awarding step awards the prescribed points to the user registered in association with the prediction data if said prediction data and the result data satisfy a predetermined condition;
valuable data provision step in which said network game server device enables exchange of accumulated points for game related prizes of differing value in accordance with the points awarded to the user in said point awarding step, the game related prizes being provided in the form of the valuable data; and
said point awarding step enabling exchange of accumulated prizes for points by deleting a designated prize and increasing the accumulated points of the user by an amount associated with the designated prize.

7. An executable network game progress control program stored on a computer readable medium within a network device, for controlling progress of a network game, the network game using a network game server device that executes a game in which users are enabled to acquire valuable data having a prescribed value by performing transmission and reception of data with a plurality of terminal devices employed by the users through a network, said executable program comprising:
game execution means for enabling a user to play a single game out of a plurality of games;
point awarding means that awards prescribed points to the user in accordance with the results of a game played by the user using said game execution means;
prediction data registration means for receiving from said terminal device prediction data corresponding to the content of a prediction by the user regarding an actual phenomenon that may occur in the future and that registers the received prediction data in association with the user;
result data acquisition means for acquiring the phenomenon that actually occurs in respect of said prediction data as result data;
said point awarding means awards the prescribed points to the user registered in association with the prediction data if said prediction data and the result data satisfy a predetermined condition;
valuable data provision means for enabling exchange of accumulated points for game related prizes of differing value to the user in accordance with the points awarded to the user by said point awarding means, the game related prizes being provided in the form of the valuable data: and
said point awarding means enabling exchange of accumulated prizes for points by deleting a designated prize and increasing the accumulated points of the user by an amount associated with the designated prize.

8. A computer readable medium which stores an executable network game progress control program for controlling progress of a network game using a network game server device that executes a game in which users are enabled to acquire valuable data having a prescribed value by performing transmission and reception of data with a plurality of terminal devices employed by the users through a network, said executable program comprising:
game execution means for enabling a user to play a single game out of a plurality of games;
point awarding means that awards prescribed points to the user in accordance with the results of a game played by the user using said game execution means;
prediction data registration means for receiving from said terminal device prediction data corresponding to the content of a prediction by the user regarding an actual phenomenon that may occur in the future and that registers the received prediction data in association with the user;
result data acquisition means for acquiring the phenomenon that actually occurs in respect of said prediction data as result data;
said point awarding means awards the prescribed points to the user registered in association with the prediction data if said prediction data and the result data satisfy a predetermined condition;
valuable data provision means for enabling exchange of accumulated points for game related prizes of differing value to the user in accordance with the points awarded to the user by said point awarding means, the game related prizes being provided in the form of the valuable data; and
said point awarding means enabling exchange of accumulated prizes for points by deleting a designated prize and increasing the accumulated points of the user by an amount associated with the designated prize.

9. A network game server device that conducts a game in which a user is enabled to acquire valuable data having a prescribed value by performing transmission and reception of data with a terminal device employed by the user through a network, the network game server device comprising:

game execution means for enabling the user to play a single game out of a plurality of games;

point awarding means for awarding prescribed points to the user in accordance with the results of a game played by the user using said game execution means;

prediction data registration means for receiving from said terminal device prediction data corresponding to the content of a prediction by the user regarding an actual phenomenon that may occur in the future and that registers the received prediction data in association with the user;

result data acquisition means for acquiring the phenomenon that actually occurs in respect of said prediction data as result data;

said point awarding means awards the prescribed points to the user registered in association with the prediction data if said prediction data and the result data satisfy a predetermined condition;

game related prize providing means for enabling exchange of accumulated points for data representing game related prizes of differing value in accordance with the points awarded to the user by said point awarding means, the game related prizes being provided in the form of the valuable data; and said point awarding means enabling exchange of accumulated prizes for points by deleting a designated prize and increasing the accumulated points of the user by an amount associated with the designated prize.

10. A network game server device of claim 9, further comprising a storage means for storing user data for each user, the user data to be stored including a user ID data, data of points accumulated by the user and data of prizes accumulated by the user; and access receiving means for enabling the user to access and view the data of prizes.

11. A network game server device of claim 10, wherein said point awarding means is adapted to increase the points stored by the storage means, and the access receiving means enables the user to access the data of points stored in the storage means.

12. A network game server device of claim 10, wherein said game related prize providing means is adapted to add data of a game related prize to the data of prizes stored in the storage means and subtract points from the data of the points scored in the storage means in response to user's request.

13. A network game server device of claim 12, wherein said game related prize is in the form of image data stored and accumulated in the storage means, said access receiving means enables the user to view the image of the image data.

14. A network game server device of claim 13, wherein said access receiving means includes protection means for preventing the user from copying the image data.

15. A network game server device of claim 10, wherein said access receiving means includes protection means for preventing the user from copying image data.

16. A network game server device of claim 10, wherein said point awarding means includes prize display means for displaying list or prizes so that the user may designate a prize to be exchanged for points.

17. A network game server device that conducts a game in which a user is enabled to acquire valuable data having a prescribed value by performing transmission and reception of data with a terminal device employed by the user through a network, the network game server device comprising:

game execution means for enabling the user to play a single game out of a plurality of games;

point awarding means for awarding prescribed points to the user in accordance with the results of a game played by the user using said game execution means;

prediction data registration means for receiving from said terminal device prediction data corresponding to the content of a prediction by the user regarding an actual phenomenon that may occur in the future and that registers the received prediction data in association with the user;

result data acquisition means for acquiring the phenomenon that actually occurs in respect of said prediction data as result data;

said point awarding means awards the prescribed points to the user registered in association with the prediction data if said prediction data and the result data satisfy a predetermined condition;

means for enabling exchange of accumulated points for data representing a sports souvenir related to said game, said sports souvenir having a value in accordance with the points awarded to the user by said point awarding means, the sports souvenir being provided in the form of the valuable data; and said point awarding means further enabling exchange of accumulated data representing the sports souvenir related to said game for points by deleting a designated sports souvenir and increasing the accumulated points of the user by an amount associated with the designated sports souvenir.

18. A network game server device that conducts a game in which a user effects transmission and reception of data with a terminal device which is a mobile phone, employed by the user through a network, the network game server device comprising:

game execution means for enabling the user to play a game selected from a plurality of games and earn points based on performance in said game;

user information storage means for storing information associated with the user;

point awarding means for awarding prescribed points to the user in accordance with results of the game played by the user using said game execution means and stores said prescribed points in said user information storage means;

valuable data provision means for providing to the user valuable data having a prescribed value in accordance with the points obtained by the user by said point awarding means;

a communication section configured to run a communication program and to perform processing for transmission and reception of various types of data with the mobile phone;

wherein the communication section is configured to execute:

a function of receiving as prediction data from the mobile phone a prediction of an actual phenomenon that occurs in a future time for the purpose of accumulating points;

a function of receiving a request to provide valuable data which is requested from the mobile phone;

a function of receiving a points exchange request made from the mobile phone to exchange points for at least a portion of the valuable data; and a function of receiving from the mobile phone a request to peruse the valuable data supplied to the user;

said point awarding means deleting the valuable data stored in the user information storage means in response to a point exchange request from the user, and storing points in said user information storage means in an amount determined in accordance with a value determined for the valuable data; and a valuable data perusal processing section which performs prescribed data processing preventing the valuable data sent to the mobile phone from being copied at the mobile phone, when the request to peruse is received from the mobile phone.

19. The network game apparatus of claim 18, wherein:

said valuable data exists stored in said user information storage means after completion of and outside of said game played by said user, and is accessible for viewing via the mobile phone;

said point awarding means operates to exchange said points after completion of and outside of said game played by said user; and said point awarding means enables exchange of the valuable data for points after completion of and outside of said game played by said user.

\* \* \* \* \*